US012693177B2

(12) United States Patent　　(10) Patent No.:　US 12,693,177 B2
Utsuki et al.　　　　　　　　　　(45) Date of Patent:　　Jul. 28, 2026

(54) INFORMATION PROCESSING APPARATUS, INFORMATION PROCESSING METHOD, AND PROGRAM FOR PRESENTING INFORMATION BASED ON A FORCE ESTIMATED BY USER PREPARATION TO HANDLE AN OBJECT AND A FORCE PRESENTED TO THE USER WHEN THE USER HANDLES THE OBJECT

(71) Applicant: Sony Group Corporation, Tokyo (JP)

(72) Inventors: Shingo Utsuki, Kanagawa (JP);
Tsuyoshi Ishikawa, Kanagawa (JP);
Junki Inoue, Kanagawa (JP); Takayuki Kurihara, Kanagawa (JP); Takanobu Omata, Kanagawa (JP); Shin Shiroma, Tokyo (JP); Kaoru Koike, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 434 days.

(21) Appl. No.: 18/271,951

(22) PCT Filed: Nov. 26, 2021

(86) PCT No.: PCT/JP2021/043338
§ 371 (c)(1),
(2) Date: Jul. 12, 2023

(87) PCT Pub. No.: WO2022/158117
PCT Pub. Date: Jul. 28, 2022

(65) Prior Publication Data
US 2024/0085250 A1　　Mar. 14, 2024

(30) Foreign Application Priority Data

Jan. 19, 2021　(JP) ................................. 2021-006687

(51) Int. Cl.
*G01L 1/00* (2006.01)
*G06F 3/0481* (2022.01)
(52) U.S. Cl.
CPC ............ *G01L 1/005* (2013.01); *G06F 3/0481* (2013.01)
(58) Field of Classification Search
CPC . A61B 5/1116; A61B 5/1118; G06F 2203/014
See application file for complete search history.

(56) References Cited

U.S. PATENT DOCUMENTS 4,882,677 A　*　11/1989　Curran ................... A61B 5/103
　　　　　　　　　　　　　　　　　　128/923
4,912,638 A　*　3/1990　Pratt, Jr. ............ A63B 21/4005
　　　　　　　　　　　　　　　　　　600/595

(Continued)

FOREIGN PATENT DOCUMENTS

CN　　　115586832 A　*　1/2023　............ G06F 3/015
JP　　2020-116684 A　　8/2020
(Continued)

OTHER PUBLICATIONS

English Translation of CN-115586832-A (Year: 2023).*

(Continued)

*Primary Examiner* — Tran M. Tran
(74) *Attorney, Agent, or Firm* — Paratus Law Group, PLLC

(57)　　　　　　　ABSTRACT

An information processing apparatus including circuitry configured to acquire state information of a user during a preparatory motion of the user as the user prepares to handle a tangible object, estimate, based on the acquired state information, a first amount corresponding to a magnitude of a force predicted by the user regarding the tangible object, and control presentation of information to the user based on the first amount and a second amount stored in a memory in (Continued)

association with a force to be presented to the user when the user handles the tangible object.

20 Claims, 14 Drawing Sheets

(56)                    References Cited

U.S. PATENT DOCUMENTS

| | | | | |
|---|---|---|---|---|
| 5,275,045 | A * | 1/1994 | Johnston | A61B 5/224 |
| | | | | 414/21 |
| 5,348,519 | A * | 9/1994 | Prince | A63B 21/0059 |
| | | | | 702/41 |
| 5,498,162 | A * | 3/1996 | Schaefer | A63B 21/072 |
| | | | | 434/258 |
| 5,555,894 | A * | 9/1996 | Doyama | A61B 5/225 |
| | | | | 600/595 |
| 5,577,981 | A * | 11/1996 | Jarvik | A63B 24/00 |
| | | | | 482/4 |
| 5,621,667 | A * | 4/1997 | Waters | G01G 19/00 |
| | | | | 702/101 |
| 5,898,111 | A * | 4/1999 | Blankenship | A63B 21/0605 |
| | | | | 482/93 |
| 6,056,671 | A * | 5/2000 | Marmer | A61B 5/1124 |
| | | | | 600/595 |
| 6,706,003 | B2 * | 3/2004 | Perrad | A61B 5/224 |
| | | | | 600/595 |
| 7,127,376 | B2 * | 10/2006 | Nashner | A61B 5/486 |
| | | | | 702/185 |
| 9,161,708 | B2 * | 10/2015 | Elliott | A61B 5/11 |
| 9,804,672 | B2 * | 10/2017 | Anderson | G06F 3/016 |
| 9,868,026 | B2 * | 1/2018 | Marcandelli | A63B 23/03541 |
| 9,916,011 | B1 * | 3/2018 | Berme | G06F 3/011 |
| 10,299,738 | B2 * | 5/2019 | Raghavan | A61B 5/1125 |
| 10,646,153 | B1 * | 5/2020 | Berme | A61B 5/1036 |
| 11,325,029 | B2 * | 5/2022 | Nakamura | A63F 13/218 |
| 11,406,289 | B2 * | 8/2022 | Elhawary | A61B 5/746 |
| 11,422,626 | B2 * | 8/2022 | Ishikawa | G06V 20/20 |
| 11,524,226 | B2 * | 12/2022 | Nakagawa | G05G 5/03 |
| 12,053,890 | B2 * | 8/2024 | Kelch | B25J 9/1671 |
| 12,056,281 | B2 * | 8/2024 | Kim | G06Q 10/04 |
| 12,130,630 | B2 * | 10/2024 | Kasuya | G06F 3/016 |
| 2004/0127337 | A1 * | 7/2004 | Nashner | A61B 5/486 |
| | | | | 482/100 |
| 2007/0093989 | A1 * | 4/2007 | Nashner | A61B 5/4023 |
| | | | | 600/595 |
| 2009/0119030 | A1 * | 5/2009 | Fang | A63F 13/803 |
| | | | | 702/41 |
| 2012/0303332 | A1 * | 11/2012 | Mangione-Smith | |
| | | | | A61B 5/1077 |
| | | | | 703/1 |
| 2013/0286004 | A1 * | 10/2013 | McCulloch | G06T 19/006 |
| | | | | 345/419 |
| 2016/0112279 | A1 * | 4/2016 | Kalanithi | G06F 3/03 |
| | | | | 715/736 |
| 2018/0000407 | A1 * | 1/2018 | Johnson | A61B 5/1126 |
| 2023/0090384 | A1 * | 3/2023 | Spenninger | B25J 9/1694 |

FOREIGN PATENT DOCUMENTS

| | | | | |
|---|---|---|---|---|
| JP | 2020-124464 A | | 8/2020 | |
| KR | 20220158155 A | * | 11/2022 | G06F 3/017 |

OTHER PUBLICATIONS

English Translation of KR-20220158155-A (Year: 2022).*

Terada et al., An Analysis Method of Baggage Lifting Motion for Lower Backache Prevention, IEEJ Transactions on Electronics, Information and Systems, The Institute of Electrical Engineers of Japan, Dec. 2020, pp. 1369-1379, vol. 140, No. 12 (see International Search Report below for concise relevance).

Taima et al., Basic study on modifying weight perception by changing the visual movement while lifting an object, IEICE Technical Report, Jun. 2013, pp. 1-6.

Yanagisawa, Computational model of the expectation effect in perception of physical properties, The Transactions of Human interface Society, 2016, pp. 309-317, vol. 18, No. 4.

Translation of Jan. 18, 2022, International Search Report issued for related PCT application No. PCT/JP2021/043338.

* cited by examiner

F I G . 2
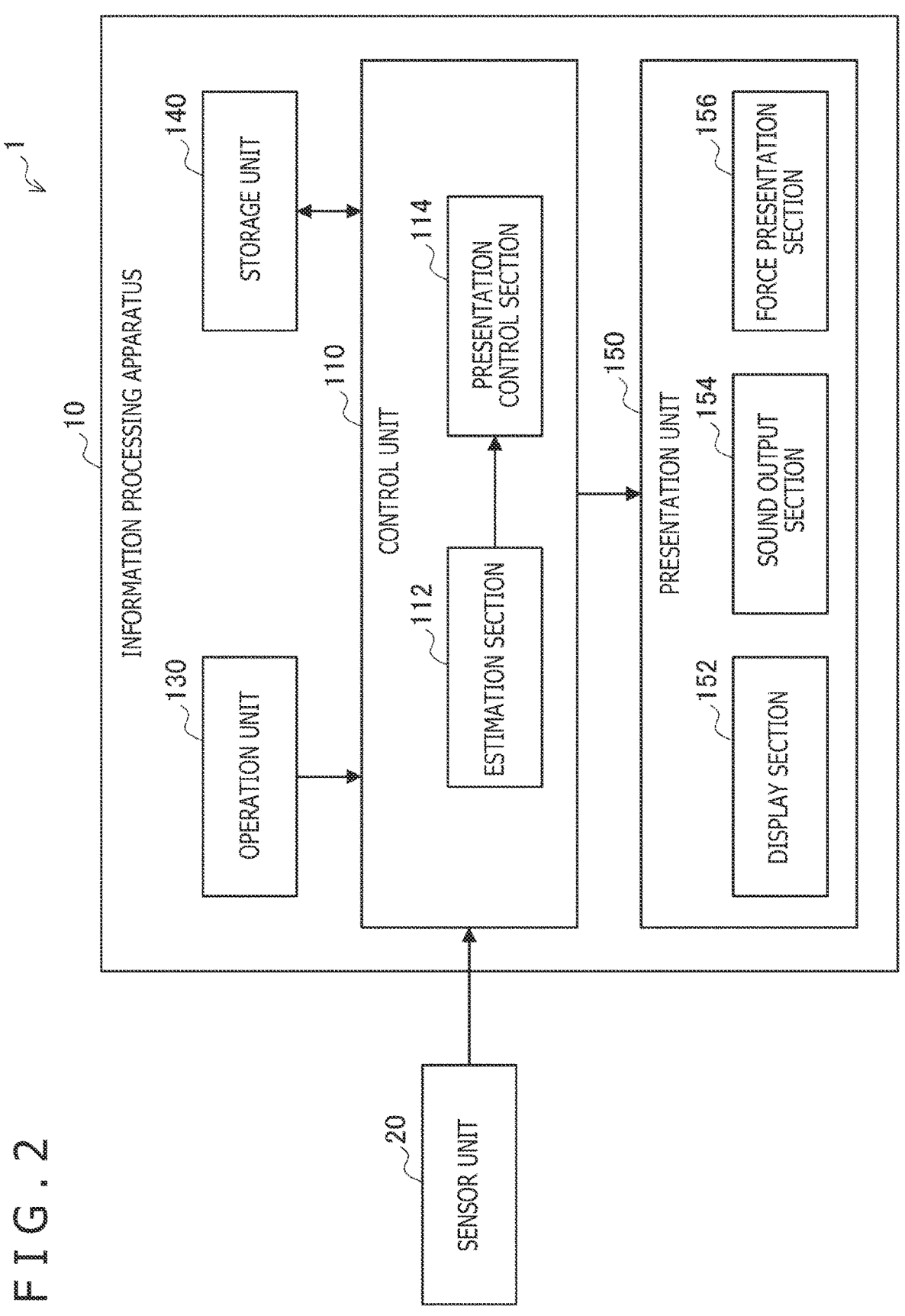

F I G . 3
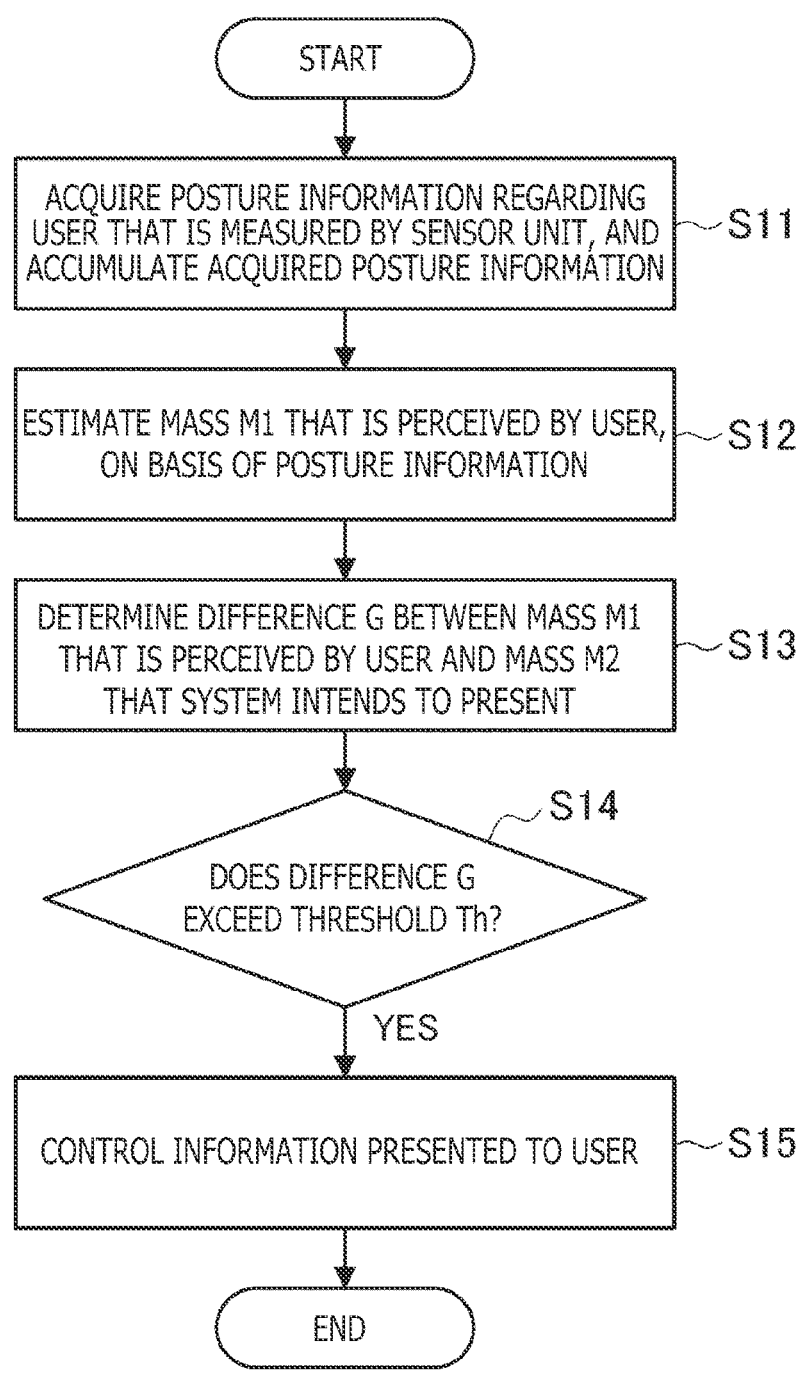

FIG.6

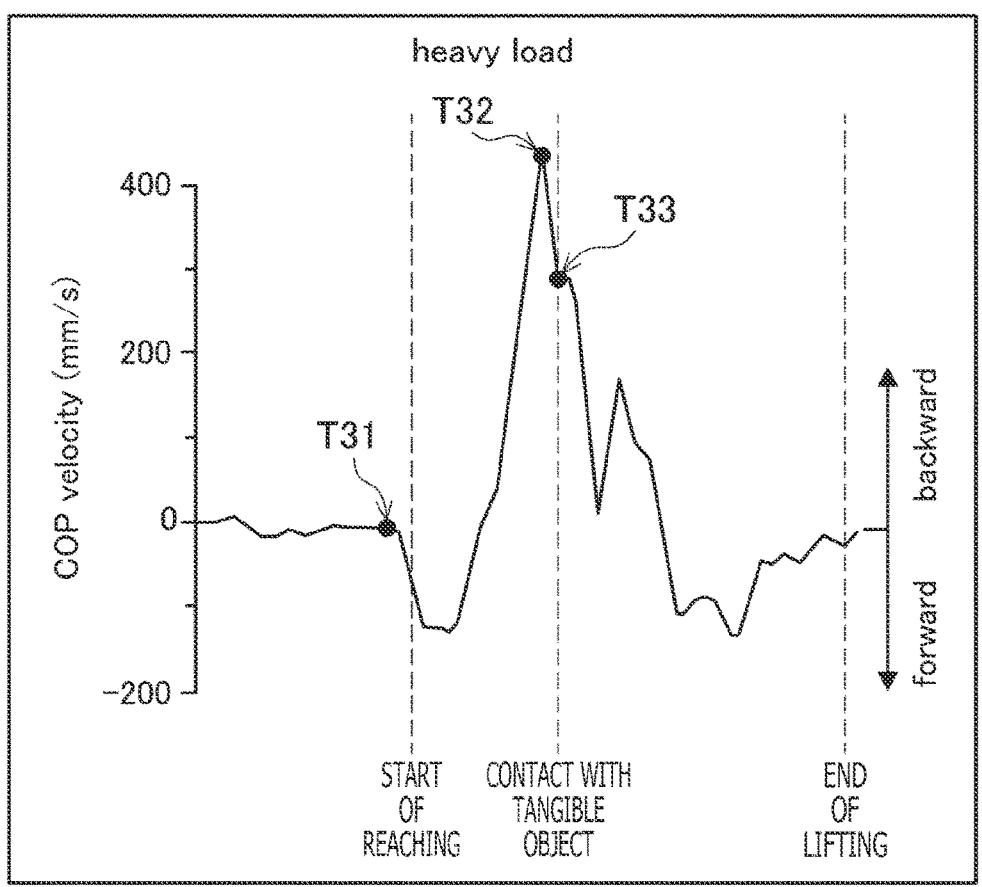

FIG.7

| RISK INDICATOR | DETERMINATION CONDITION |
|---|---|
| SLIPPERINESS OF FOOTING | FRICTION COEFFICIENT OF FLOOR IS EQUAL TO OR LESS THAN XX |
| STABILITY OF TANGIBLE OBJECT | CONTACT AREA BETWEEN TANGIBLE OBJECT AND FLOOR IS EQUAL TO OR LESS THAN XX |
| FRAGILITY | TANGIBLE OBJECT IS REGISTERED AS OBJECT THAT NEEDS TO BE HANDLED WITH CARE |
| VALUE OF TANGIBLE OBJECT | RARITY OR PRICE IS EQUAL TO OR MORE THAN XX |

F I G . 8
| PERCEIVED MASS | REDUCE | INCREASE |
|---|---|---|
| SIZE | SMALLER | LARGER |
| MATERIAL | GLOSSY | MATTE |
| BRIGHTNESS | HIGHER | LOWER |
| MOTION | MOVE IN ADVANCE REBOUND COEFFICIENT (LIGHT) | MOVE IN DELAYED MANNER REBOUND COEFFICIENT (HEAVY) |
| MOTION OF ANOTHER PERSON | MOTION OF LIFTING LIGHT TANGIBLE OBJECT | MOTION OF LIFTING HEAVY TANGIBLE OBJECT |
F I G . 9
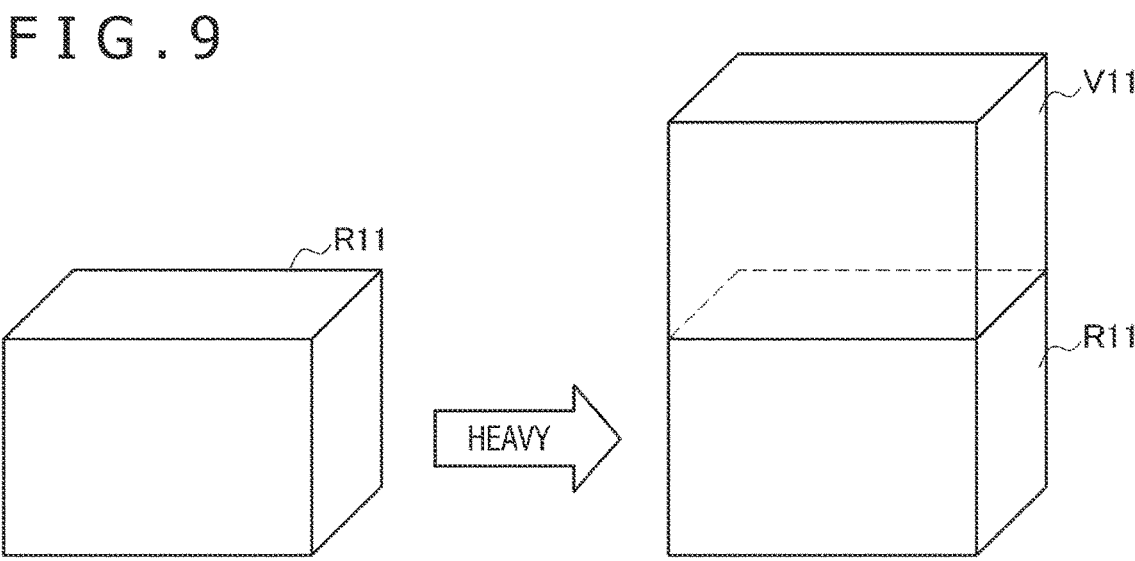
F I G . 1 0
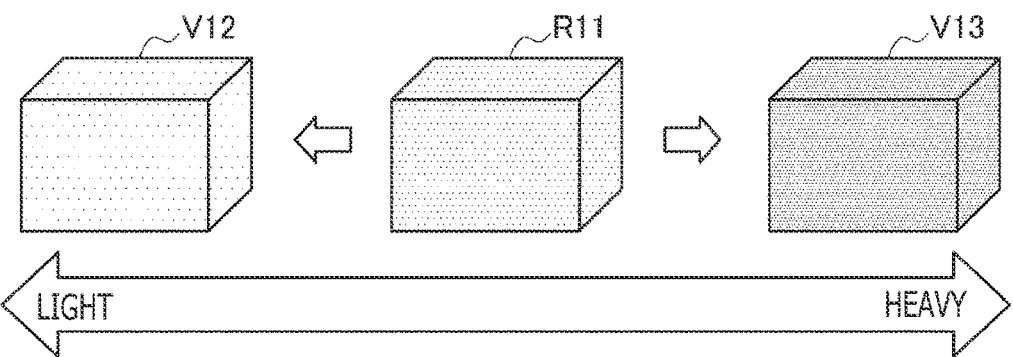

Figure 2:
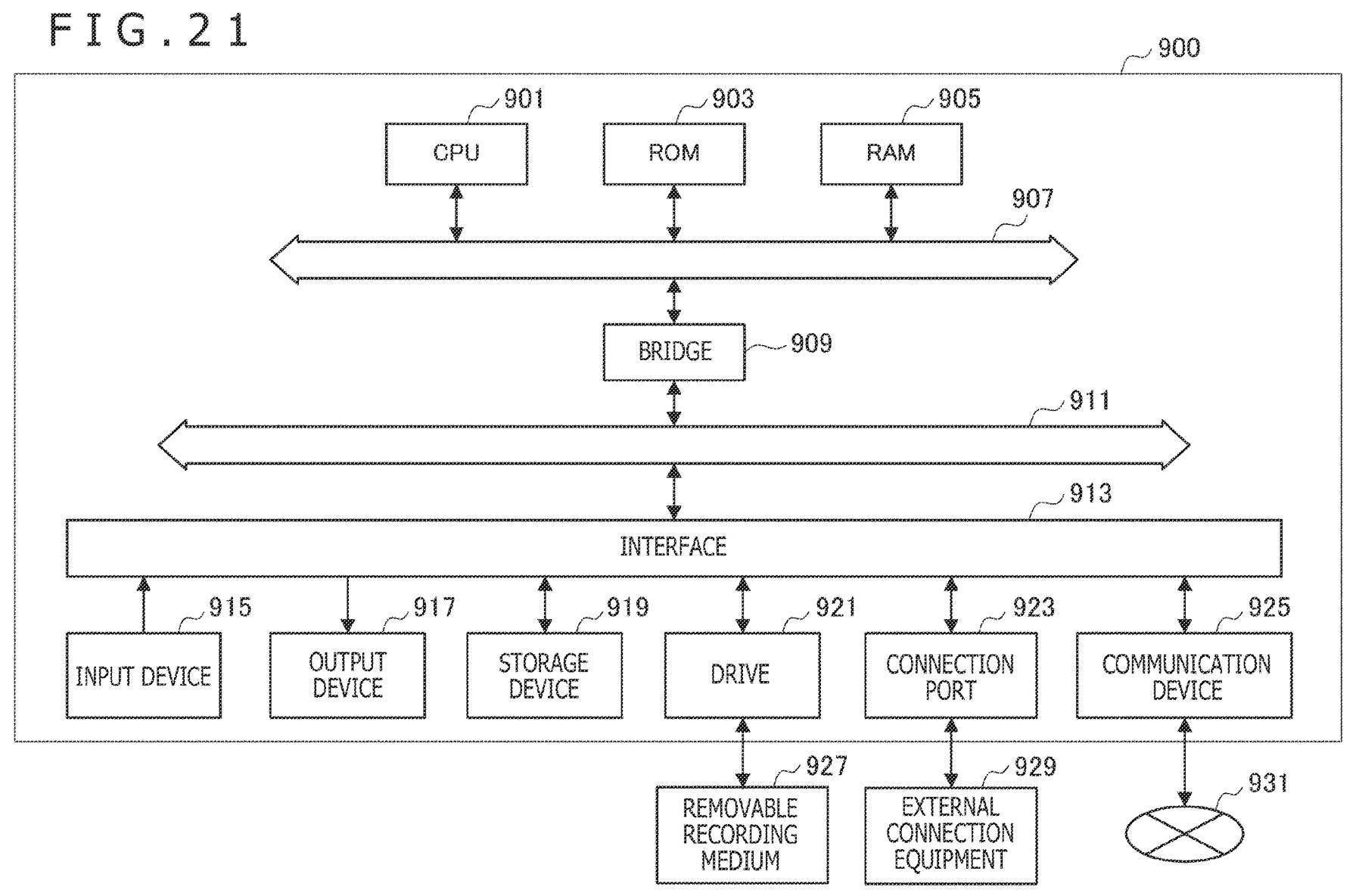

F I G . 2 1

900

907

901 CPU

903 ROM

905 RAM

909 BRIDGE

911

913

INTERFACE

915 INPUT DEVICE

917 OUTPUT DEVICE

919 STORAGE DEVICE

921 DRIVE

923 CONNECTION PORT

925 COMMUNICATION DEVICE

927 REMOVABLE RECORDING MEDIUM

929 EXTERNAL CONNECTION EQUIPMENT

931

INFORMATION PROCESSING APPARATUS, INFORMATION PROCESSING METHOD, AND PROGRAM FOR PRESENTING INFORMATION BASED ON A FORCE ESTIMATED BY USER PREPARATION TO HANDLE AN OBJECT AND A FORCE PRESENTED TO THE USER WHEN THE USER HANDLES THE OBJECT

CROSS REFERENCE TO PRIOR APPLICATION

This application is a National Stage Patent Application of PCT International Patent Application No. PCT/JP2021/043338 (filed on Nov. 26, 2021) under 35 U.S.C. § 371, which claims priority to Japanese Patent Application No. 2021-006687 (filed on Jan. 19, 2021), which are all hereby incorporated by reference in their entirety.

TECHNICAL FIELD

The present disclosure relates to an information processing apparatus, an information processing method, and a program.

BACKGROUND ART

In recent years, there has been known a technology for determining a load imposed on a user, with the use of force applied to the user in relation to a tangible object. For example, there has been disclosed a technology in which the posture of a user who is lifting a tangible object is measured and the load imposed on the body of the user is determined on the basis of the measurement result (see, for example, PTL 1). Additionally, there has been disclosed a technology in which the posture of a user who is lifting a tangible object is measured and whether the posture of the user is such a posture as to put considerable strain on the body of the user is determined on the basis of the measurement result (see, for example, PTL 2).

CITATION LIST

Patent Literature

[PTL 1]
    JP 2020-124464A
[PTL 2]
    JP 2020-116684A

SUMMARY

Technical Problem

However, it is desired to provide such a technology that enables a more effective reduction in a load imposed on the user, with the use of the force applied to the user in relation to the tangible object.

Solution to Problem

According to an aspect of present disclosure, there is provided an information processing apparatus that includes a control unit configured to estimate, on the basis of a state of a user, a first amount that is predicted by the user with regard to force applied to the user in relation to a tangible object, and control presentation of information to the user on the basis of the first amount and a second amount that is preliminarily registered with regard to the force.

Additionally, according to another aspect of the present disclosure, there is provided an information processing method that includes estimating, by a processor, on the basis of a state of a user, a first amount that is predicted by the user with regard to force applied to the user in relation to a tangible object, and controlling, by the processor, presentation of information to the user on the basis of the first amount and a second amount that is preliminarily registered with regard to the force.

Additionally, according to yet another aspect of present disclosure, there is provided a program causing a computer to function as an information processing apparatus that includes a control unit configured to estimate, on the basis of a state of a user, a first amount that is predicted by the user with regard to force applied to the user in relation to a tangible object, and control presentation of information to the user on the basis of the first amount and a second amount that is preliminarily registered with regard to the force.

BRIEF DESCRIPTION OF DRAWINGS

FIG. 2 is a diagram illustrating a functional configuration example of an information processing apparatus according to the embodiment.

FIG. 3 is a flowchart illustrating a general operation example of the information processing apparatus according to the embodiment.

FIG. 6 is a diagram depicting temporal changes in the velocity of the center of pressure of the user lifting a heavy tangible object.

FIG. 7 is a diagram illustrating a case in which a risk level of handling of a tangible object is higher than a predetermined level, by way of example.

FIG. 8 is a diagram for describing an outline of control of presentation information for the user.

FIG. 9 is a diagram for describing an example of changing the size of a tangible object.

FIG. 10 is a diagram for describing an example of changing the brightness of the tangible object.

FIG. 21 is a block diagram depicting a hardware configuration example of an information processing apparatus.

DESCRIPTION OF EMBODIMENT

Figure 1:
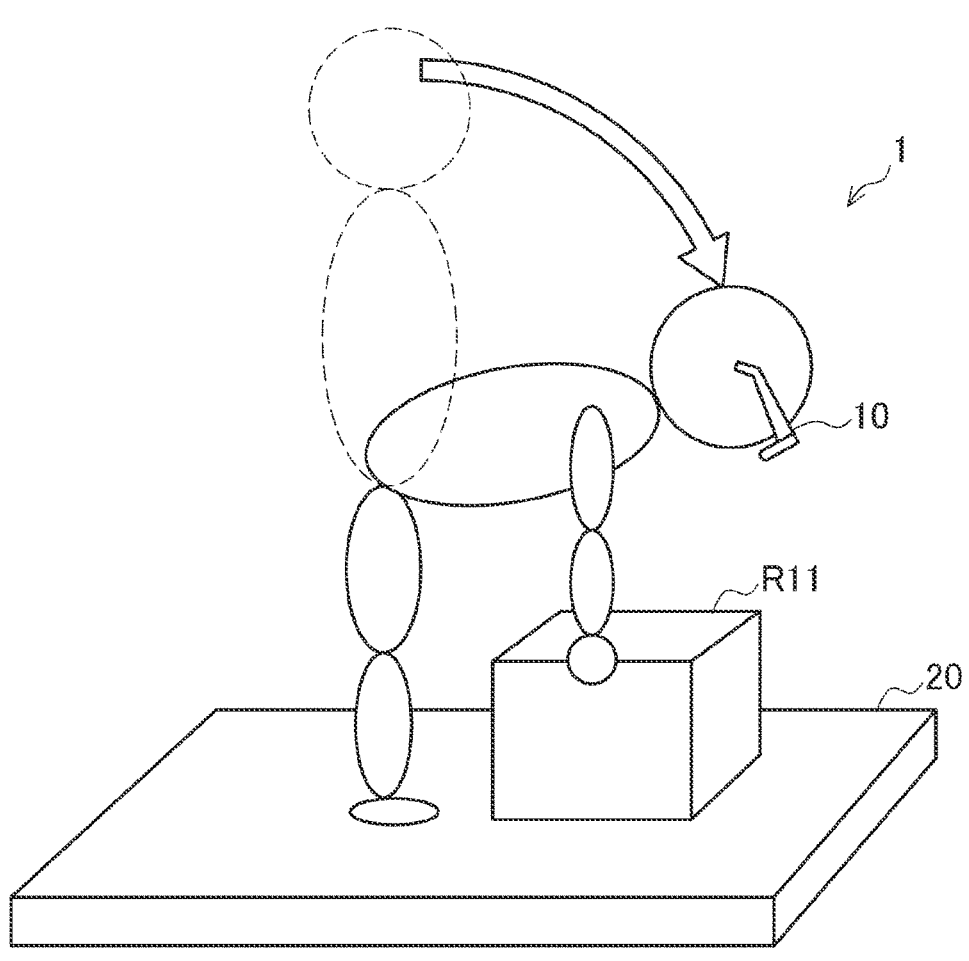
FIG. 1 is a diagram for describing a configuration example of an information processing system according to an embodiment of the present disclosure.

With reference to the accompanied drawings, a preferred embodiment of the present disclosure will be described below in detail. Note that, in the present specification and drawings, components having substantially the same functional configuration are denoted by the same reference sign, and duplicate description of the components is omitted.

Additionally, in the present specification and drawings, multiple components having substantially the same or similar functional configuration are distinguished from one another by appending different numbers to the same reference sign, in some cases. However, in a case where the multiple components having substantially the same or similar functional configuration need not particularly be distinguished from one another, the components are denoted only by the same reference sign. Additionally, similar components in different embodiments are distinguished from one another by appending different alphabetical characters to the same reference sign, in some cases. However, in a case where these similar components need not particularly be distinguished from one another, the components are denoted only by the same reference sign.

Note that the description is given in the following order.

0. Outline
1. Details of Embodiment
    1.1. System Configuration Example
    1.2. Functional Configuration Example
    1.3. Functional Details
2. First Modification
3. Second Modification
4. Third Modification
5. Hardware Configuration Example
6. Summary

0. Outline

First, an outline of an embodiment of the present disclosure will be described. In recent years, there has been known a technology for determining a load imposed on a user, with the use of the force applied to the user in relation to a tangible object. For example, there has been disclosed a technology in which the posture of a user who is lifting a tangible object is measured and the load imposed on the body of the user is determined on the basis of the measurement result. Additionally, there has been disclosed a technology in which the posture of a user who is lifting a tangible object is measured and whether the posture of the user is such a posture as to put considerable strain on the body of the user is determined on the basis of the measurement result.

In the embodiment of the present disclosure, there is mainly proposed such a technology that enables an effective reduction in a load imposed on the user, with the use of the force applied to the user in relation to the tangible object. More specifically, in the disclosed technologies described above, the posture of the user who is actually lifting the tangible object is measured. Hence, the load imposed on the user, which is determined on the basis of the measurement result, can be determined only after the user actually lifts the tangible object.

However, before the force is actually applied to the user in relation to the tangible object, the user can previously predict an amount (first amount) related to the force to be applied to the user in relation to the tangible object, by visually recognizing the tangible object. At this time, it is essential to determine the amount of the force that is predicted by the user. The reason why this is essential will first be explained.

Note that the embodiment of the present disclosure assumes a case where the user who visually recognizes a tangible object handles the tangible object. At this time, the embodiment of the present disclosure mainly assumes a case where the tangible object handled by the user is a real object. However, as described later in modifications and the like, the tangible object handled by the user may be a virtual object.

Further, there is mainly assumed below a case where the direction of the force applied to the user in relation to the tangible object is downward (for example, a case where the user lifts a tangible object). That is, in such a case, the user predicts an amount (mass of the tangible object) which causes the force to be applied downward to the user in relation to the tangible object. Hence, the amount (first amount) related to the force which is predicted by the user is also expressed as a "perceived mass M1." The perceived mass M1 may be the mass of a real object as an example of the tangible object. Alternately, as described later in the modifications and the like, the perceived mass M1 may be a quasi-mass of a virtual object as an example of the tangible object.

However, the direction of the force applied to the user in relation to the tangible object need not be downward. That is, the user may predict the magnitude of the force (not limited to the downward force) to be applied to the user in relation to the tangible object. In other words, the amount (first amount) related to the force which is predicted by the user need not be the mass of the tangible object and may be the magnitude of the force to be applied to the user in relation to the tangible object.

On the other hand, in the system, an amount (second amount) related to the force applied to the user in relation to the tangible object is preliminarily registered. The amount related to the force, which is registered in the system, corresponds to an amount related to the force that the system intends to present to the user.

Note that assumed below is a case where the amount (mass of the tangible object) which causes the force to be applied downward to the user in relation to the tangible object is preliminarily registered in the system. Hence, the amount (second amount) related to the force which is preliminarily registered in the system is also expressed below as an "mass M2 that the system intends to present." The mass M2 that the system is to present may be the known mass of the real object as an example of the tangible object. Alternately, as described later in the modifications and the like, the mass M2 that the system is to present may be a known quasi-mass of a virtual object as an example of the tangible object.

However, in the system, the magnitude of the force (not limited to a downward force) applied to the user in relation to the tangible object may be registered. In other words, the amount (second amount) related to the force, which is registered in the system, need not be the mass of the tangible object and may be the magnitude of the force applied to the user in relation to the tangible object.

Here, in a case where there is a difference between the mass M2 that the system intends to present and the perceived mass M1, the following obstructions and loads may possibly be caused. The possibility of the obstructions and loads may increase with the increase in the difference between the mass M2 that the system intends to present and the perceived mass M1. Note that examples of such obstructions and loads include a physical obstruction, a tangible-object obstruction, and a cognitive load.

Physical obstruction: In a case where a tangible object lifted by the user is heavy, where a surface (footing) in contact with feet of the user lifting a package is slippery, or where the tangible object lifted by the user has a characteristic shape, for example, the user may possibly be unable to appropriately control his or her own body. At this time, an injury or the like inflicted on the body of the user corresponds to the "physical obstruction."

Material obstruction: As is the case with the physical obstruction, the user may possibly be unable to appropriately control his or her own body. At this time, damage to the tangible object (property damage) corresponds to the "material obstruction." Note that, for the property damage, in a case where the tangible object has a high value (for example, the tangible object is very rare or valuable) or where the tangible object is highly likely to be damaged, for example, the material obstruction can particularly be critical.

Cognitive load: In a case where a force presentation device provides force (force feedback) to the user in relation to a virtual object as an example of the tangible object, force predicted by the user on the basis of visual recognition of the virtual object may possibly fail to match an amount that the force presentation device intends to present. In such a case, the user feels a sense of mismatch between handling feelings. The sense of mismatch between the handling feelings may be stronger with the increase in the difference between the mass M2 that the system intends to present and the perceived mass M1. Note that, as also described below, a display capable of AR (Augmented Reality) display or VR (Virtual Reality) display may display the virtual object.

To reduce the possibility of the obstructions and loads as described above, it is essential to determine the perceived mass M1 before the force is applied to the user in relation to the tangible object, and it is also essential to eliminate the difference between the mass M2 that the system intends to present and the perceived mass M1. Thus, the user can handle the tangible object as predicted.

The outline of the embodiment of the present disclosure has been described above.

1. Details of Embodiment

Now, the embodiment of the present disclosure will be described in detail.

1.1. System Configuration Example

First, a configuration example of an information processing system according to the embodiment of the present disclosure will be described.

FIG. 1 is a diagram for describing the configuration example of the information processing system according to the embodiment of the present disclosure. As depicted in FIG. 1, the information processing system, denoted by 1, according to the embodiment of the present disclosure includes an information processing apparatus 10 and a sensor unit 20.

The embodiment of the present disclosure mainly assumes a case where the information processing apparatus 10 is an AR device (for example, AR glasses) worn on the body of the user. However, the information processing apparatus 10 is not limited to the AR device. For example, the information processing apparatus 10 may be any wearable device other than the AR device (for example, a VR device or the like). Alternatively, the information processing apparatus 10 may be any terminal other than the wearable device (for example, a smartphone or the like).

The sensor unit 20 includes a sensor for detecting the state of the user in a time series. The sensor unit 20 continuously outputs results of the detection of the state of the user to the information processing apparatus 10. The embodiment of the present disclosure mainly assumes a case where the sensor unit 20 detects the posture of the user as an example of the state of the user. At this time, the sensor unit 20 outputs, to the information processing apparatus 10, the posture information regarding the user corresponding to the detection result. However, the sensor unit 20 may detect any state other than the posture of the user as an example of the state of the user.

Additionally, the embodiment of the present disclosure mainly assumes a case where the sensor unit 20 includes a sensor for measuring the pressure of the sole of the user (that is, a sole pressure measuring device). However, the sensor unit 20 is not limited to a particular type. The variation of the sensor unit 20 will be described later in detail. Further, as the sole pressure measuring device, any of the following types may be used: a sole pressure distribution measuring type that measures the pressure distribution on the sole surface, a floor reaction force measuring type that measures a reaction force from the floor acting on the sole, and the like. Additionally, in the example depicted in FIG. 1, the sensor unit 20 is a sole pressure measuring device of an installation type installed on the floor surface. However, the sensor unit 20 may be a sole pressure measuring device of an insole type that is placed in a shoe.

In the example illustrated in FIG. 1, a tangible object R11 handled by the user is depicted. The user is to lift the tangible object R11. Here, as an example, assumed is a case where the tangible object R11 is a real object (particularly a package) and where the user who handles the tangible object R11 is a staff member who transfers (e.g., installs or deliveries) the package. It can be assumed herein that examples of the package include precision equipment and work of art. However, the tangible object R11 is not limited to a particular type.

The configuration example of the information processing system according to the embodiment of the present disclosure has been described above.

1.2. Functional Configuration Example

Now, a functional configuration example of the information processing apparatus 10 according to the embodiment of the present disclosure will be described. FIG. 2 is a diagram illustrating a functional configuration example of the information processing apparatus 10 according to the embodiment of the present disclosure. As depicted in FIG. 2, the information processing apparatus 10 according to the embodiment of the present disclosure includes a control unit 110, an operation unit 130, a storage unit 140, and a presentation unit 150. The information processing apparatus 10 is connected to the sensor unit 20.

(Control Unit 110)

The control unit 110 may include, for example, one or more CPUs (Central Processing Units) or the like. In a case where the control unit 110 includes a processing device such as a CPU, such a processing device may include an electronic circuit. The control unit 110 can be implemented by such a processing device executing a program. The control unit 120 includes an estimation section 112 and a presentation control section 114. Specific functions of these blocks will be described later in detail.

(Operation Unit 130)

The operation unit 130 includes a function of receiving an operation input by the user. For example, the operation unit 130 may include an input device such as a touch panel or buttons. For example, the operation unit 130 receives, as a determination operation, an operation made by the user touching the operation unit 130. Additionally, the determination operation received by the operation unit 130 may cause execution of processing corresponding to the attitude of the information processing apparatus 10.

(Storage Unit 140)

The storage unit 140 is a recording medium that includes a memory and that store programs to be executed by the control unit 110 and data required to execute the programs (various databases and the like). Additionally, the storage unit 140 temporarily store data to be used for calculation executed by the control unit 110. The storage unit 140 includes a magnetic storage unit device, a semiconductor storage device, an optical storage device, a magneto-optic storage device, or the like.

(Presentation Unit 150)

The presentation unit 150 is an example of a presentation device that presents various types of information under the control of the control unit 110. The presentation unit 150 includes a display section 152, a sound output section 154, and a force presentation section 156.

(Display Section 152)

The display section 152 includes a display. The embodiment of the present disclosure mainly assumes a case where the display section 152 includes a transmissive display that allows a user to visually recognize images in a real space. However, the display section 152 may be an optical see-through display or may be a video see-through display. Alternatively, the display section 152 may be a non-transmissive display that presents, instead of images in the real space, images in a virtual space having a three-dimensional structure corresponding to the real space.

The transmissive display is usually used for AR (Augmented Reality), whereas the non-transmissive display is usually used for VR (Virtual Reality). The display section 152 may include an XR (X Reality) display used for both AR and VR applications. For example, the display section 152 AR-displays a virtual object and UI-displays text and the like.

(Sound Output Section 154)

The sound output section 154 is an example of a presentation device that presents various types of information under the control of the control unit 110. The embodiment of the present disclosure mainly assumes a case where the display section 152 presents various types of information. However, instead of or in addition to the display section 152, the sound output section 154 may present various types of information. At this time, the sound output section 154 functions as a speaker that outputs various types of information as sounds under the control of the control unit 110.

(Force Presentation Section 156)

The force presentation section 156 is an example of a presentation device that presents various types of information under the control of the control unit 110. The embodiment of the present disclosure mainly assumes a case where the display section 152 presents various types of information. However, instead of or in addition to the display section 152, the force presentation section 156 may present various types of information. At this time, the force presentation section 156 functions as a force presentation device that presents various types of information by using the force under the control of the control unit 110.

The functional configuration example of the information processing apparatus 10 according to the embodiment of the present disclosure has been described above.

1.3. Functional Details

Now, with reference to FIGS. 3 to 15 (also referring to FIGS. 1 and 2 as appropriate), the details of functions of the information processing apparatus 10 according to the embodiment of the present disclosure will be described. First, with reference to FIG. 3, a general operation example of the information processing apparatus 10 according to the embodiment of the present disclosure will be described.

General Operation Example

FIG. 3 is a flowchart illustrating a general operation example of the information processing apparatus 10 according to the embodiment of the present disclosure. The sensor unit 20 detects the posture of the user in a time series. Here, the sensor unit 20 detects the posture of the user during an interval from the start of the motion of the user who is about to handle a tangible object (for example, a preparatory motion for lifting the tangible object R11) until the start of handling of the tangible object (for example, the point of time when the user touches the tangible object R11).

The sensor unit 20 continuously outputs detection results to the information processing apparatus 10 as the posture information regarding the user. Then, the estimation section 112 of the information processing apparatus 10 acquires the posture information regarding the user which is output from the sensor unit 20. The estimation section 112 accumulates the acquired posture information regarding the user in the storage unit 140 (S11). The estimation section 112 estimates the mass M1 perceived by the user, on the basis of the posture information regarding the user which is output from the sensor unit 20 (S12).

The presentation control section 114 controls information presented to the user, on the basis of the perceived mass M1 that is estimated by the estimation section 112 and the mass M2 that the system intends to present. This eliminates the difference between the mass M2 that the system intends to present and the perceived mass M1, enabling an effective reduction in the load imposed on the user, with the use of the force applied to the user in relation to the tangible object.

More specifically, the presentation control section 114 calculates a difference G according to the mass M2 that the system intends to present and the perceived mass M1 (S13). Then, the presentation control section 114 controls information presented to the user, on the basis of the calculated difference G.

More specifically, the presentation control section 114 determines whether the calculated difference G exceeds a predetermined threshold Th (S14). Then, in a case where the calculated difference G exceeds the threshold Th ("YES" in S14), on the basis of the difference G exceeding the threshold Th, the presentation control section 114 controls the presentation unit 150 to present predetermined information to the user (S15). On the other hand, in a case where the calculated difference G does not exceed the threshold Th, the information presented to the user need not be controlled.

The general operation example of the information processing apparatus 10 according to the embodiment of the present disclosure has been described above.

(S12: Estimation of Perceived Mass M1)

Now, with reference to FIGS. 4 to 6, estimation of the perceived mass M1 will be described in detail.

According to academic knowledge, it has been known that, when the user is to lift a tangible object, there is a correlation between the mass of the tangible object and a change in the posture of the user. Accordingly, for each of multiple different tangible objects, the estimation section 112 preliminarily accumulates, in the storage unit 140, a correspondence between the mass of the tangible object and a change in the posture of the user who lifts the tangible object, as accumulated data, and determines the correlation (correlation function) between the tangible object and the change in the posture of the user on the basis of the accumulated data. Thus, the estimation section 112 can estimate the perceived mass M1 on the basis of the correlation determined in advance and the posture information regarding the user.

Such a correlation between the mass of the tangible object and the change in the posture of the user is generally expected to hold true in not only a case where the user lifts a tangible object but also a case where the user handles a tangible object. That is, as is the case with the correlation between the mass of the tangible object and the change in the posture of the user, it is also conceivable that there is a correlation between the magnitude of the force applied to the user in relation to the tangible object and the change in the posture of the user.

(Case where Center of Pressure is Used as Posture Information)

Note that, as described above, the embodiment of the present disclosure mainly assumes a case where the sensor unit 20 includes a sole pressure measuring device. The sole pressure measuring device can measure the center of pressure (COP) corresponding to the center of distribution of the force acting on the contact surface between the floor and the body of the user. Here, first, a case where the center of pressure (COP) is used as the posture information regarding the user will be described.

More specifically, with regard to the correlation between the mass of the tangible object lifted by the user and the center of pressure (COP), it has been known according to academic knowledge that, in a case where the tangible object has a small mass, the change in the center of pressure is small compared with a case where the tangible object has a large mass. Consequently, the estimation section 112 is only required to estimate the perceived mass M1 on the basis of the preliminarily determined correlation between the mass of the tangible object and the change in the center of pressure and of a newly measured change in the center of pressure of the user. With reference to FIGS. 4 to 6, an example of the correlation between the mass of the tangible object and the change in the center of pressure will be described.

Figure 4:
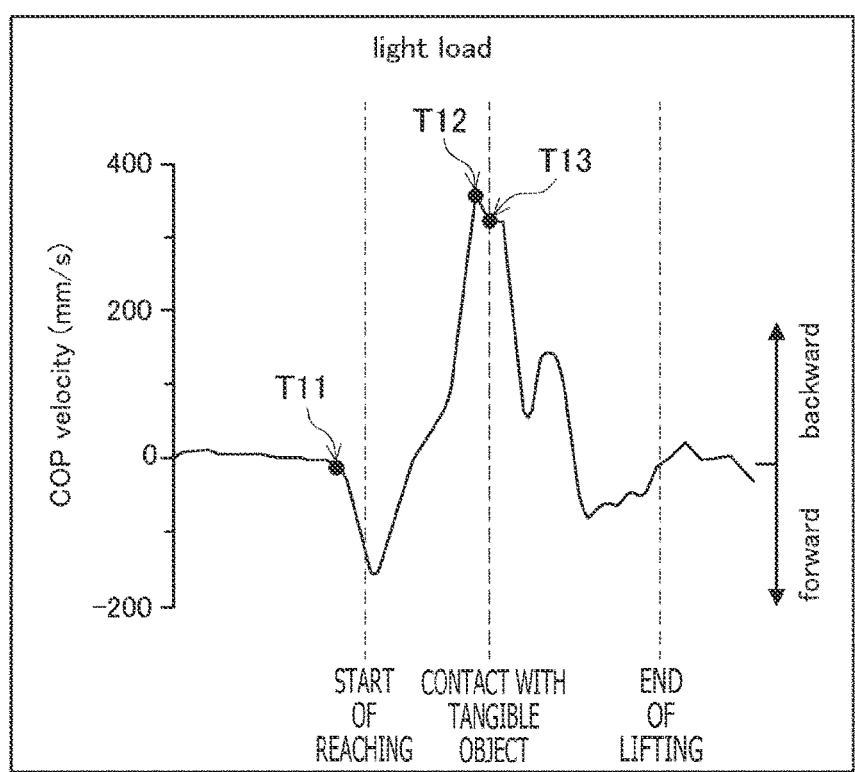
FIG. 4 is a diagram depicting temporal changes in the velocity of the center of pressure of a user lifting a light tangible object.

FIG. 4 is a diagram depicting temporal changes in the velocity of the center of pressure of the user lifting a light tangible object. FIG. 5 is a diagram depicting temporal changes in the velocity of the center of pressure of the user lifting a tangible object with a medium weight. FIG. 6 is a diagram depicting temporal changes in the velocity of the center of pressure of the user lifting a heavy tangible object. In either one of FIGS. 4 to 6, the horizontal axis corresponds to time, and the vertical axis corresponds to the velocity of the center of pressure (COP). Note that, on the vertical axis, a positive direction (upward direction) matches a direction from the heel to toe of the foot.

Figure 5:
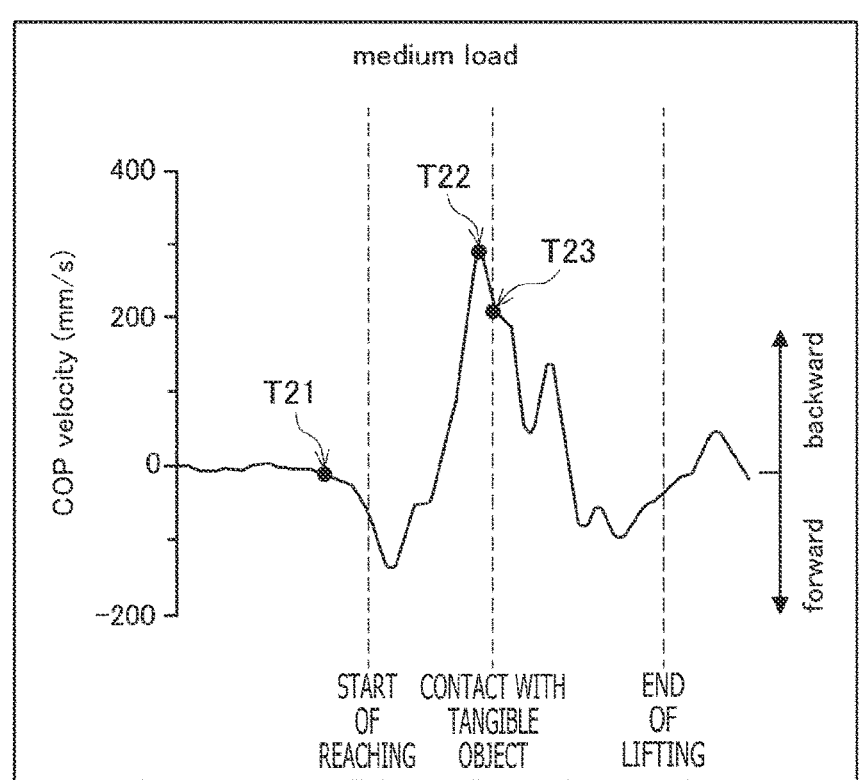
FIG. 5 is a diagram depicting temporal changes in the velocity of the center of pressure of the user lifting a tangible object with a medium weight.

Additionally, all of FIGS. 4 to 6 depict "Start of reaching," "Contact with tangible object," and "End of lifting." "Start of reaching" corresponds to the start of the motion of the user who is about to handle a tangible object (for example, a preparatory motion for lifting the tangible object). "Contact with tangible object" corresponds to the start of handling of the tangible object (for example, the point of time when the user touches the tangible object). "End of lifting" corresponds to the end of lifting of the tangible object.

Additionally, FIG. 4 depicts the start of backward displacement (a value on the vertical axis corresponding to a point of time T11), the initial peak of forward displacement (a value on the vertical axis corresponding to a point of time T12), and the minimum value of the initial peak (a value on the vertical axis corresponding to a point of time T13). The "forward displacement" is measured after measurement of the backward displacement.

Similarly to FIG. 4, FIG. 5 depicts the start of backward displacement (a value on the vertical axis corresponding to a point of time T21), the initial peak of forward displacement (a value on the vertical axis corresponding to a point of time T22), and the minimum value of the initial peak (a value on the vertical axis corresponding to a point of time T23). Additionally, FIG. 6 depicts the start of backward displacement (a value on the vertical axis corresponding to a point of time T31), the initial peak of forward displacement (a value on the vertical axis corresponding to a point of time T32), and the minimum value of the initial peak (a value on the vertical axis corresponding to a point of time T33).

Examples illustrated in FIGS. 4 to 6 indicate that the difference between the initial peak of forward displacement and the minimum value of the initial peak increases with the increase in the mass of the tangible object (that is, as the mass increases from FIG. 4 through FIG. 5 to FIG. 6). Accordingly, the estimation section 112 is only required to preliminarily determine a correlation function in which the mass of the tangible object increases with the increase in the difference between the initial peak of forward displacement and the minimum value of the initial peak, and estimate the perceived mass M1 on the basis of such a correlation function and a newly measured difference (that is, the difference between the initial peak of forward displacement and the minimum value of the initial peak).

(Modifications of Posture Information)

Note that the case where the center of pressure (COP) is used as the posture information regarding the user has mainly been described. However, any information other than the center of pressure (COP) may be used as the posture information regarding the user. For example, the position of the center of gravity of the user body varies with the change in the posture of the user. Accordingly, the center of gravity (COG) may be used as the posture information regarding the user.

For example, in a case where the information processing apparatus 10 includes a camera, an optical motion capture may be used. The optical motion capture tracks the position of each somite of the user by tracking, on the basis of camera images, an optical reflection marker attached to the somite of the user. Alternatively, in a case where the sensor unit 20 includes a magnetic sensor, a magnetic motion capture may be used. The magnetic motion capture tracks the position of each somite of the user by using a magnetic field line detected by a magnetic sensor worn on the body of the user.

The estimation section 112 may use such a motion capture to determine the position of the center of gravity and the mass of each somite (for example, the head, the brachial region, and the like). Then, the estimation section 112 may determine the center of gravity of the upper body on the basis of the position of the center of gravity and the mass of each somite of the upper body, and determine the center of gravity of the lower body on the basis of the position of the center of gravity and the mass of each somite of the lower body. Further, the estimation section 112 may calculate the center of gravity of the user body by combining the center of gravity of the upper body with the center of gravity of the lower.

Alternatively, the center of mass (COM) may be used as the posture information regarding the user. However, in a case where the gravity acts uniformly on the body of the user, the center of mass (COM) matches the center of gravity (COG) of the user body. Note that, according to academic knowledge, it has been known that there is a correlation between the center of pressure (COP) and the center of mass (COM).

Alternatively, an electromyogram (EMG) of the user may be used as the posture information regarding the user. For example, in a case where the sensor unit 20 includes a wired or wireless electromyograph, the electromyograph is used to obtain an action potential generated when the muscle of the user contracts. The action potential measured as described above may be used as the posture information regarding the user.

Note that, according to academic knowledge, it has been known that muscle activity appears (myoelectric potential changes) in the body of the user (for example, the foot, the arm, or the like) before the user lifts an object. Additionally, according to academic knowledge, it has also been known that, in a case where the user knows the weight of a falling ball, the degree of anticipatory postural adjustment (APA) of the user who is to catch the falling ball increases with the increase in the weight of the ball.

The estimation of the perceived mass M1 has been described in detail above.

(S13: Calculation of Difference G)

Now, the calculation of the difference G will be described in detail.

As described above, the presentation control section 114 calculates the difference G according to the mass M2 that the system intends to present and the perceived mass M1. Here, assumed is a case where the presentation control section 114 calculates the difference G on the basis of subtraction of the perceived mass M1 from the mass M2 that the system intends to present. However, the presentation control section 114 may calculate the difference on the basis of subtraction of the mass M2 that the system intends to present from the perceived mass M1. In this case, the threshold Th is switched between positivity and negativity, and the operation based on the result of the comparison between the difference G and the threshold Th is also reversed.

Note that the risk level of handling of the tangible object is assumed to change depending on the situation. For example, in a case where the risk level of handling of the tangible object is higher than a predetermined level, the tangible object needs to be handled more carefully. Hence, the presentation control section 114 may add a predetermined amount to the mass M2 that the system intends to present, and calculate the difference G on the basis of subtraction of the perceived mass M1 from the mass M2 that the system intends to present and to which the predetermined amount has been added. Note that the addition of the predetermined amount to the mass M2 that the system intends to present is synonymous with the subtraction of the predetermined amount from the threshold Th.

For example, an example of the case where the risk level of handling of the tangible object is higher than the predetermined level may be a case where the difficulty level of handling of the tangible object is higher than a predetermined level. Accordingly, in the case where the difficulty level of handling of the tangible object is higher than the predetermined level, the presentation control section 114 may add, as an example of the predetermined amount, the amount corresponding to the "high" difficulty level of handling of the tangible object to the mass M2 that the system intends to present. The amount corresponding to the "high" difficulty level of handling of the tangible object may preliminarily be registered.

Alternatively, another example of the case where the risk level of handling of the tangible object is higher than the predetermined level is assumed to be a case where the importance level of the tangible object is higher than a predetermined level. Accordingly, in the case where the importance level of the tangible object is higher than the predetermined level, the presentation control section 114 may add, as an example of the predetermined amount, the amount corresponding to the "high" importance level of handling of the tangible object to the mass M2 that the system intends to present. The amount corresponding to the "high" importance level of handling of the tangible object may preliminarily be registered.

FIG. 7 is a diagram illustrating an example of the case where the risk level of handling of the tangible object is higher than the predetermined level. As seen in FIG. 7, "slipperiness of footing" is one of risk indicators. For example, as an example of the case where the difficulty level of handling of the tangible object is higher than the predetermined level, in a case where the friction coefficient of the floor is less than or equal to a predetermined value, the presentation control section 114 may add the predetermined amount corresponding to the "high" difficulty level to the mass M2 that the system intends to present. Note that the friction coefficient of the floor may be measured from a camera image or the like or may preliminarily be registered.

Additionally, as seen in FIG. 7, "stability of tangible object" is one of the risk indicators. For example, as an example of the case where the difficulty level of handling of the tangible object is higher than the predetermined level, in a case where the contact area between the tangible object and the floor is less than or equal to a predetermined value, the presentation control section 114 may add the predetermined amount corresponding to the "high" difficulty level to the mass M2 that the system intends to present. Note that the contact area between the tangible object and the floor may be measured from a camera image or the like or may preliminarily be registered.

Further, as seen in FIG. 7, "fragility" is one of the risk indicators. For example, as an example of the case where the importance level of the tangible object is higher than the predetermined level, in a case where the tangible object is registered as an object that needs to be handled with care, the presentation control section 114 may add the predetermined amount corresponding to the "high" importance level to the mass M2 that the system intends to present. Note that information indicating whether the tangible object is registered as the tangible object that needs to be handled with care may preliminarily be registered in such a manner as to be linked with an object number or may be acquired by using, as a key, the object number read from a tag attached to the tangible object.

Additionally, as seen in FIG. 7, "value of tangible object" is one of the risk indicators. For example, as an example of the case where the importance level of the tangible object is higher than the predetermined level, in a case where the rarity or price of the tangible object has a predetermined value or larger, the presentation control section 114 may add the predetermined amount corresponding to the "high" importance level to the mass M2 that the system intends to present. Note that the rarity or price of the tangible object may preliminarily be registered in such a manner as to be linked with the object number or may be acquired by using, as a key, the object number read from a tag attached to the tangible object.

The calculation of the difference G has been described in detail above.

(S14: Comparison Between Difference G and Threshold Th)

Now, comparison between the difference G and the threshold Th will be described in detail.

As described above, the presentation control section 114 determines whether the calculated difference G exceeds the predetermined threshold Th. Here, the specific value of the threshold Th is not limited. Additionally, the threshold Th may preliminarily be registered. As an example, the threshold Th may be optionally set by the provider of the system.

The comparison between the difference G and the threshold Th has been described in detail above.

(S15: Control of Presentation Information for User)

Now, with reference to FIGS. 8 to 15, control of presentation information for the user will be described in detail. As described above, in a case where the calculated difference G exceeds the threshold Th, on the basis of the difference G exceeding the threshold Th, the presentation control section 114 controls the presentation unit 150 to present predetermined information to the user.

For example, assumed is a case where the difference G is above a threshold Th1. In such a case, the difference G is reduced by increasing the perceived mass M1, and thus, the presentation control section 114 is only required to control the presentation unit 150 to present information used to increase the perceived mass M1.

On the other hand, also assumed is a case where the difference G is below a threshold Th2. In such a case, the difference G is reduced by reducing the perceived mass M1, and thus, the presentation control section 114 is only required to control the presentation unit 150 to present information used to reduce the perceived mass M1.

Note that the threshold Th1 used to determine whether the difference G is above the threshold Th1 may have the same value as or a value different from that of the threshold Th2 used to determine whether the difference G is below the threshold Th2. For example, the threshold Th1 used to determine whether the difference G is above the threshold Th1 may be larger than the threshold Th2 used to determine whether the difference G is below the threshold Th2.

First, with reference to FIG. 8, an outline of the control of the presentation information for the user will be described. FIG. 8 is a diagram for describing the outline of the control of the presentation information for the user. As seen in FIG. 8, examples of information used to reduce the perceived mass M1 are described in rows of "reduce," whereas examples of information used to increase the perceived mass M1 are described in rows of "increase."

(Control of Size)

As depicted in the second row in FIG. 8, as an example, the presentation control section 114 can reduce the perceived mass M1 by reducing the size of the tangible object recognized by the user. On the other hand, the presentation control section 114 can increase the perceived mass M1 by increasing the size of the tangible object recognized by the user. In such a manner, the presentation control section 114 can increase or reduce the perceived mass M1 by changing the size of the tangible object recognized by the user. Note that, according to academic knowledge, it has been known that there is a correlation between the size of the tangible object and the perceived mass M1.

FIG. 9 is a diagram for describing an example of changing the size of the tangible object. FIG. 9 depicts the tangible object R11. Here, assumed is a case where the tangible object R11 is a real object. On the basis of the difference G exceeding the threshold Th, the presentation control section 114 controls the display section 152 to display an object used to increase or reduce the size of the tangible object recognized by the user.

Here, assumed is a case where the perceived mass M1 is to be increased (that is, a case where the tangible object is made to appear to be heavy). In such a case, the presentation control section 114 is only required to control the display section 152 to display an object used to increase the size of the tangible object recognized by the user. More specifically, in a case where the information processing apparatus 10 includes a camera, the presentation control section 114 is only required to recognize the position and color of the tangible object R11 in a real space on the basis of a camera image, and place a virtual object V11 with the same color as or a color similar to that of the tangible object R11, at a position adjacent to the tangible object R11 (a position adjacent to an upper portion of the tangible object R11 in the example depicted in FIG. 9) in a global coordinate system linked with the real space. With this, the user can visually recognize the tangible object as if the size thereof increased.

In contrast, also assumed is a case where the perceived mass M1 is to be reduced (that is, a case where the tangible object is made to appear to be light). In such a case, the presentation control section 114 is only required to control the display section 152 to display an object used to reduce the size of the tangible object recognized by the user. More specifically, in a case where the information processing apparatus 10 includes a camera, the presentation control section 114 is only required to recognize the position of the tangible object R11 and a background color in the real space on the basis of a camera image, and place a virtual object with the background color in a part of the area of the tangible object R11 in the global coordinate system linked with the real space. With this, the user can visually recognize the tangible object as if the size thereof decreased.

(Control of Quality of Material)

Referring back to FIG. 8, description will be continued. As depicted in the third row in FIG. 8, as an example, the presentation control section 114 can reduce the perceived mass M1 by providing glossy finish to the material of the tangible object recognized by the user. On the other hand, the presentation control section 114 can increase the perceived mass M1 by providing matte finish to the material of the tangible object recognized by the user. In such a manner, the presentation control section 114 can increase or reduce the perceived mass M1 by modifying the quality of the material of the tangible object recognized by the user.

(Control of Brightness)

As depicted in the fourth row in FIG. 8, as an example, the presentation control section 114 can reduce the perceived mass M1 by increasing the brightness of the tangible object recognized by the user. On the other hand, the presentation control section 114 can increase the perceived mass M1 by reducing the brightness of the tangible object recognized by the user. In such a manner, the presentation control section 114 can increase or reduce the perceived mass M1 by changing the brightness of the tangible object recognized by the user. Note that, according to academic knowledge, it has been known that there is correlation between the brightness of the tangible object and the perceived mass M1.

FIG. 10 is a diagram for describing an example of changing the brightness of the tangible object. FIG. 10 depicts the tangible object R11. Here, assumed is a case where the tangible object R11 is a real object. On the basis of the difference G exceeding the threshold Th, the presentation control section 114 controls the display section 152 to display an object with brightness different from that of the tangible object, in at least a partial area of the tangible object in the field of view of the user.

Here, assumed is a case where the perceived mass M1 is to be increased (that is, a case where the perceived mass M1 is made to appear to be heavy). In such a case, the presentation control section 114 is only required to control the display section 152 to display an object having a lower brightness than the tangible object, in at least a partial area of the tangible object in the field of view of the user. More specifically, in a case where the information processing apparatus 10 includes a camera, the presentation control section 114 is only required to recognize the position of the tangible object R11 and the brightness of the tangible object R11 in the real space on the basis of a camera image, and place a virtual object V13 having a lower brightness than the tangible object R11, in at least a partial area of the tangible object R11 (the entire area of the tangible object R11 in the example depicted in FIG. 10) in the global coordinate system linked with the real space. With this, the user can visually recognize the tangible object as if the brightness thereof decreased.

In contrast, also assumed is a case where the perceived mass M1 is to be reduced (that is, a case where the perceived mass M1 is made to appear to be heavy). In such a case, the presentation control section 114 is only required to control the display section 152 to display an object having a higher brightness than the tangible object, in at least a partial area of the tangible object in the field of view of the user. More specifically, in a case where the information processing apparatus 10 includes a camera, the presentation control section 114 is only required to recognize the position of the tangible object R11 and the brightness of the tangible object R11 in the real space on the basis of a camera image, and place a virtual object V12 having a higher brightness than the tangible object R11, in at least a partial area of the tangible object R11 (the entire area of the tangible object R11 in the example depicted in FIG. 10) in the global coordinate system linked with the real space. With this, the user can visually recognize the tangible object as if the brightness thereof increased.

(Control of Motion)

Referring back to FIG. 8, description will be continued. As depicted in the fifth row in FIG. 8, as an example, the presentation control section 114 can reduce the perceived mass M1 by moving a displayed object in advance or increasing a rebound coefficient (degree of rebound) for the object. On the other hand, the presentation control section 114 can increase the perceived mass M1 by moving the displayed object in a delayed manner or reducing the rebound coefficient (degree of rebound) for the object.

In such a manner, the presentation control section 114 can increase or reduce the perceived mass M1 by controlling the motion of the object recognized by the user. Note that, according to academic knowledge, it has been known that there is a correlation between the travel distance of the tangible object and the perceived mass M1.

Figure 11:
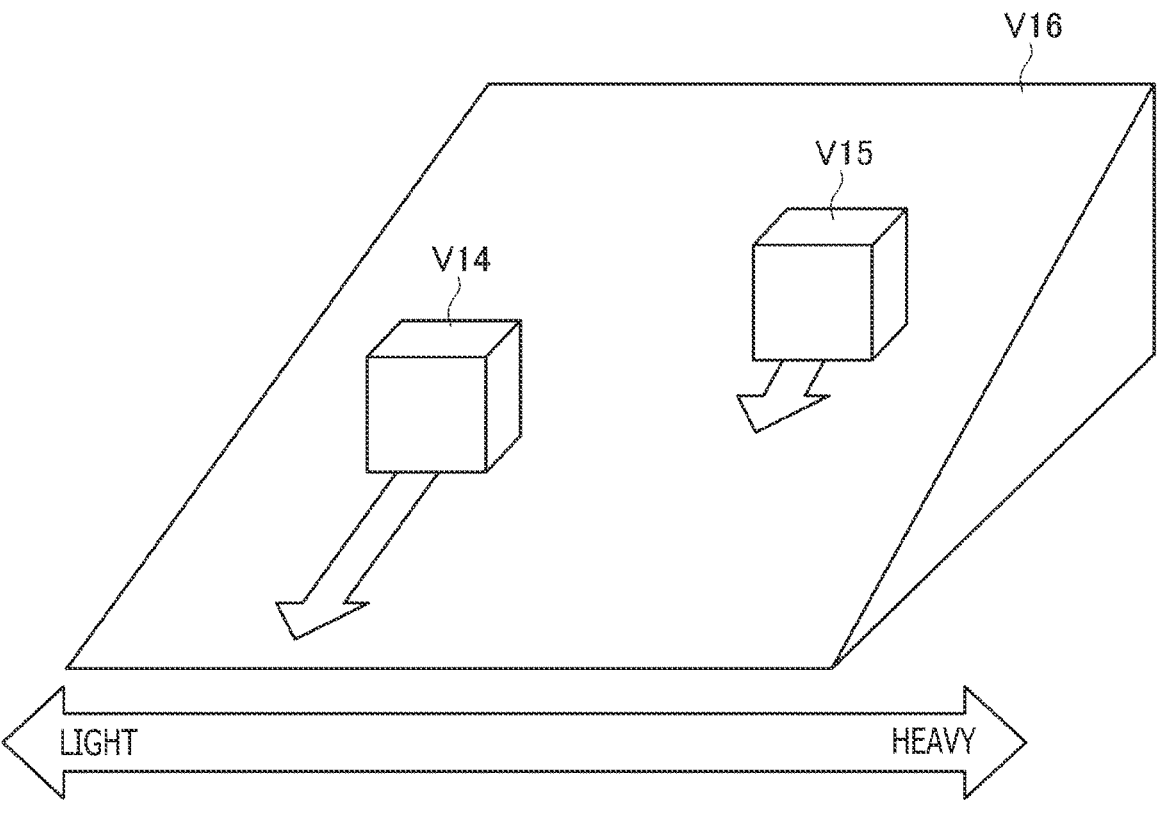
FIG. 11 is a diagram for describing an example of controlling the motion of an object.

FIG. 11 is a diagram for describing an example of controlling the motion of an object. The presentation control section 114 controls the display section 152 to display an object that moves according to the difference G. Here, the motion of the object may include at least one of a motion of traveling at a velocity corresponding to the difference G and a rebounding motion based on the degree of rebound corresponding to the difference G.

For example, the presentation control section 114 is only required to control the display section 152 to display an object moving at a velocity corresponding to the difference G. More specifically, the presentation control section 114 is only required to control the display section 152 to display a virtual object V15 moving at a velocity decreasing with the increase in the difference G (or moving in advance). Alternatively, the presentation control section 114 may control the display section 152 to display a virtual object V15 that rebounds to a degree decreasing with the increase in the difference G. As depicted in FIG. 11, a movement of the virtual object V15 may be a movement of sliding down on a virtual object V16.

In contrast, the presentation control section 114 is only required to control the display section 152 to display a virtual object V14 moving at a velocity increasing with the decrease in the difference G (or moving in a delayed manner). Alternatively, the presentation control section 114 may control the display section 152 to display the virtual object V14 that rebounds to a degree increasing with the decrease in the difference G. As depicted in FIG. 11, a movement of the virtual object V14 may be a movement of sliding down on a virtual object V16.

(Motion of Another Person)

Referring back to FIG. 8, description will be continued. As depicted in the sixth row in FIG. 8, as an example, the presentation control section 114 can reduce the perceived mass M1 by controlling the display section 152 to display another person (object) lifting a light object. On the other hand, the presentation control section 114 can increase the perceived mass M1 by controlling the display section 152 to display another person (object) lifting a heavy object. In such a manner, the user can adjust the perceived mass M1 by observing the behavior of another person.

Figure 12:
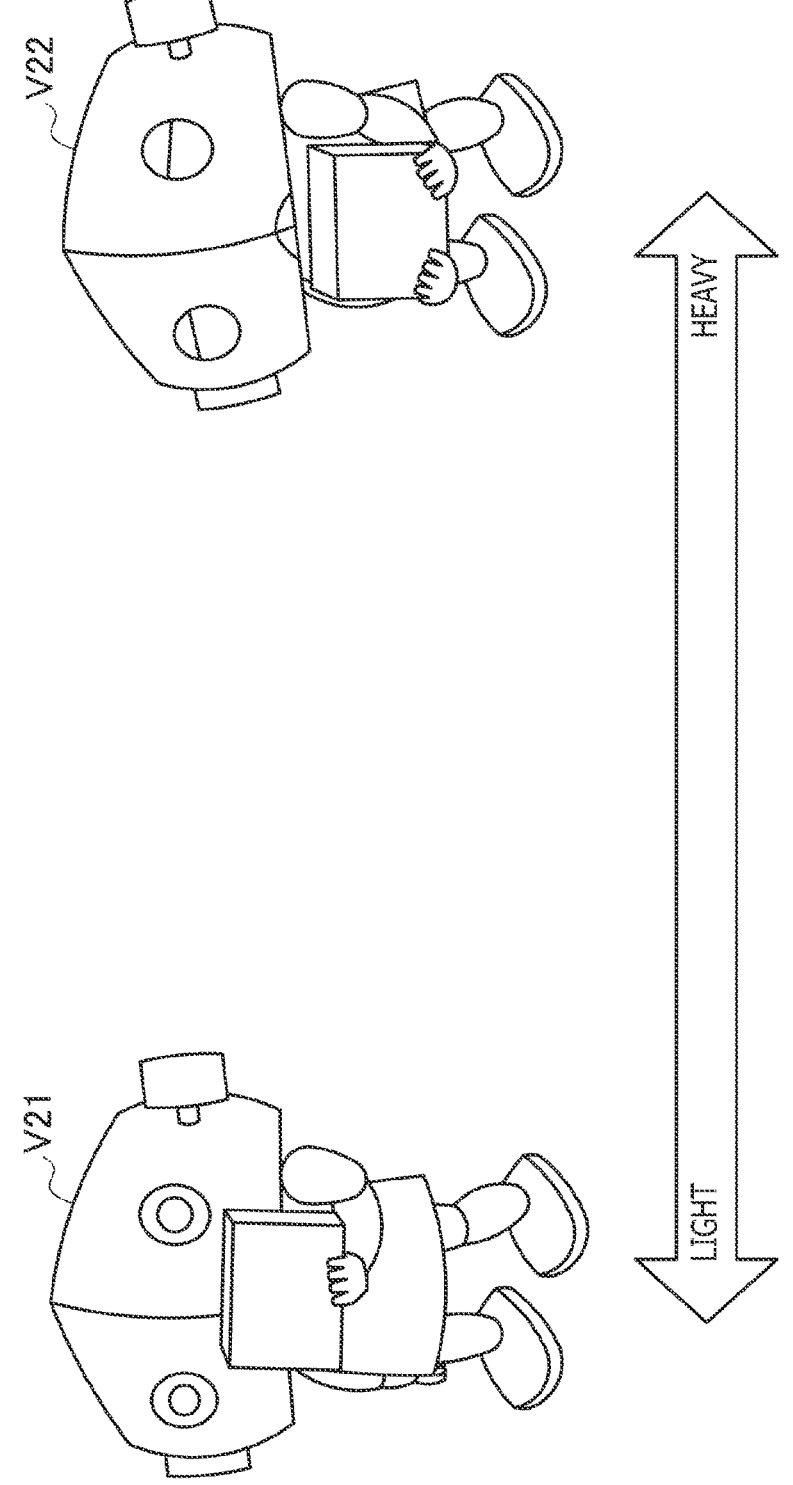
FIG. 12 is a diagram for describing an example of controlling the motion of another person.

FIG. 12 is a diagram for describing an example of controlling the motion of another person. On the basis of the difference G exceeding the threshold Th, the presentation control section 114 controls the display section 152 to display a video depicting a motion associated with a tangible object. Here, the motion associated with the tangible object may be a motion of a subject that is different from the user and that is holding the tangible object in such a manner that the tangible object appears to be light or heavy.

Here, assumed is a case where the perceived mass M1 is to be increased (that is, a case where the tangible object is made to appear to be heavy). In such a case, the presentation control section 114 is only required to control the display section 152 to display a virtual object V22 holding a tangible object in such a manner that the tangible object appears to be heavy. In contrast, also assumed is a case where the perceived mass M1 is to be reduced (that is, a case where the tangible object is made to appear to be light). In such a case, the presentation control section 114 is only required to control the display section 152 to display a virtual object V21 holding the tangible object in such a manner that the tangible object appears to be light.

Note that, in an example illustrated in FIG. 12, the virtual object displayed by the display section 152 is a video of a robot, but the virtual object is not limited to the video of the robot. For example, the virtual object may be a video of a person or the like. Alternatively, a real object may be used instead of the virtual object. At this time, in a case where the perceived mass M1 is to be increased, the presentation control section 114 is only required to control the tangible object such that the real object holds the tangible object as if the tangible object were heavy. In contrast, in a case where the perceived mass M1 is to be reduced, the presentation control section 114 is only required to control the real object such that the real object holds the tangible object as if the tangible object were light. As an example, the tangible object may be a robot.

In a case where the presentation control section 114 controls the robot, the robot may directly deliver the tangible object (for example, package) to the user (cooperative operation between the robot and the person). Note that, as described above, the mass perceived by the person is characterized in that the perceived mass can be adjusted by observation of the behavior of another person lifting the tangible object. However, in a case where an actuator torque of the robot significantly exceeds the torque of the person, for example, the user fails to sufficiently determine the mass of the tangible object even though the user observes changes in the posture of the robot lifting the tangible object. Accordingly, the perceived mass M1 fails to be appropriately adjusted.

Then, in a case where the perceived mass M1 is not appropriately adjusted, the user fails to appropriately lift the tangible object and may possibly suffer a serious physical impediment. Hence, the robot desirably mimic a posture corresponding to a lifting torque equivalent to the torque of the user to whom the tangible object is delivered. Thus, the user more appropriately adjusts the perceived mass M1 by observing the posture of the robot. Additionally, appropriate adjustment of the perceived mass M1 allows a reduction in the possibility that the user suffers a serious physical impediment.

More specifically, the presentation control section 114 determines a correlation function y=f(x) between a posture change tendency y of the user handling the tangible object and a tangible-object mass x. Then, the presentation control section 114 substitutes a package weight x' registered upon the pick-up of the package, into x of the correlation function y=f(x) to determine the posture change tendency y'. Note that, in a case where the importance level of the tangible object is higher than a predetermined level, the presentation control section 114 substitutes, into x of the correlation function y=f(x), a value obtained by adding a predetermined weight to the package weight x'.

The presentation control section 114 inputs the posture change tendency y' to a posture control section of the robot. Thus, when delivering the package to the user, the robot operates according to the posture change tendency y' input to the posture control section thereof. When the robot delivers the package to the user, the user observes changes in the posture of the robot to appropriately adjust the perceived mass M1.

(Other Control)

Techniques for increasing the perceived mass M1, other than those described above, are also available. As an example, on the basis of the difference G exceeding the threshold Th, the presentation control section 114 may control the display section 152 to display a predetermined object at a predetermined position corresponding to the area of the tangible object in the field of view of the user. For example, it is assumed that, in a case where the tangible object is a package, the user is prompted to stably lift the tangible object. In such a case, the display section 152 may be controlled to display a hand icon as an example of the object at any position in the lower half of the tangible object.

Figure 13:
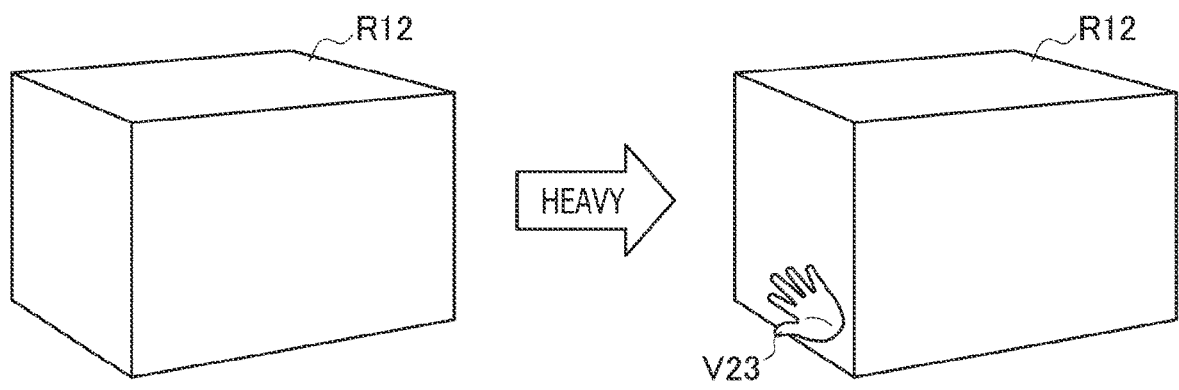
FIG. 13 is a diagram for describing a first modification of a technique for increasing a perceived mass.

FIG. 13 is a diagram for describing a first modification of a technique for increasing the perceived mass M1. FIG. 13 depicts a tangible object R12. Here, the tangible object R12 is assumed to be a real object. In a case where the perceived mass M1 is to be increased (that is, a case where the tangible object is made to appear to be heavy), the presentation control section 114 may recognize the position of the area of the tangible object R12 in the real space on the basis of a camera image, and control the display section 152 to display a virtual object V23 at any position in the lower half of the tangible object R12 in the global coordinate system linked with the real space. Note that, in an example illustrated in FIG. 13, the virtual object V23 is a hand icon, but the virtual object V23 may be any icon other than the hand icon.

Figure 14:
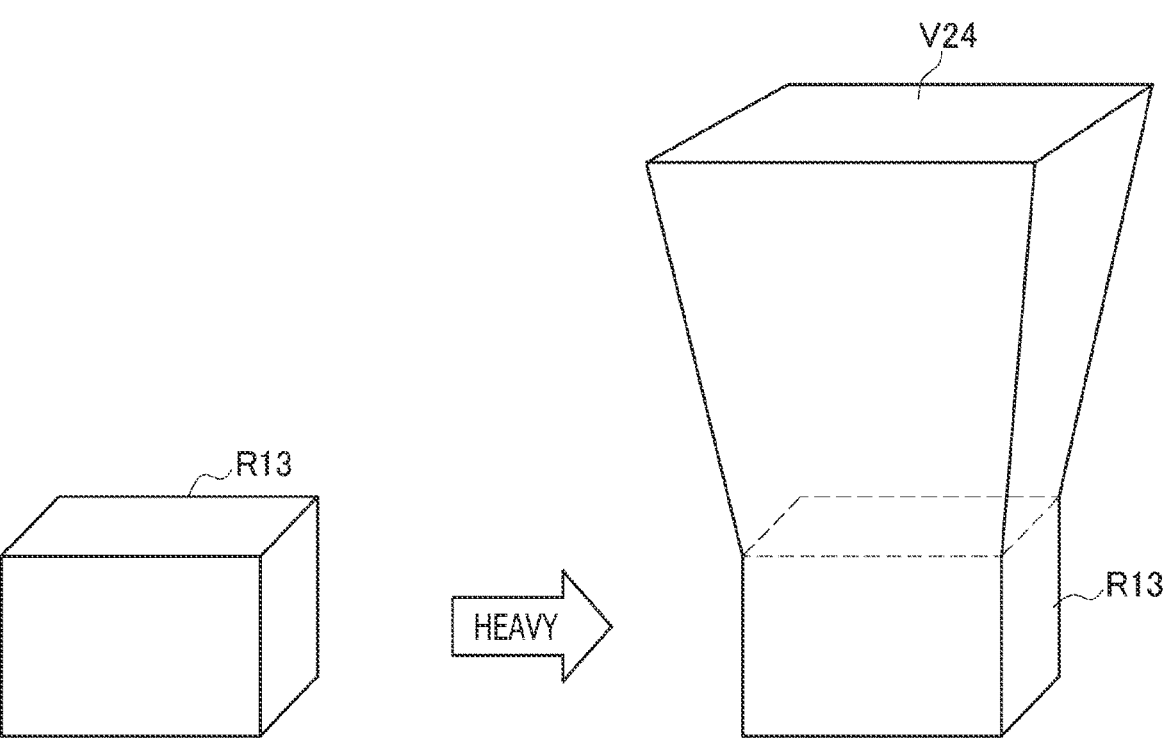
FIG. 14 is a diagram for describing a second modification of the technique for increasing the perceived mass.

FIG. 14 is a diagram for describing a second modification of a technique for increasing the perceived mass M1. FIG. 14 depicts a tangible object R13. Here, the tangible object R13 is assumed to be a real object. In a case where the perceived mass M1 is to be increased (that is, a case where the tangible object is made to appear to be heavy), the presentation control section 114 is only required to recognize the position and color of the tangible object R13 in the real space on the basis of a camera image, and place a virtual object V24 having the same color as or a color similar to that of the tangible object R13 and having an unstable shape, at a position adjacent to the tangible object R13 (a position adjacent to an upper portion of the tangible object R13 in the example depicted in FIG. 14) in the global coordinate system linked with the read space.

This makes it possible to prompt the user to stably lift the tangible object, and thus, it is expected that the perceived mass M1 can further be increased. Note that, as an example, the unstable shape may have a thickness increasing from bottom to top as in the virtual object V24, but the unstable shape is not limited to such an example.

Alternatively, on the basis of the difference G exceeding the threshold Th, the presentation control section 114 may control the display section 152 to present predetermined text. The predetermined text may be information indicating that the tangible object is heavy (or information indicating that the tangible object is light). Alternatively, on the basis of the difference G exceeding the threshold Th, the presentation control section 114 may control the sound output section 154 to present a predetermined sound. Similarly, the predetermined sound may be information indicating that the tangible object is heavy (or information indicating that the tangible object is light). Alternatively, on the basis of the difference G exceeding the threshold Th, the presentation control section 114 may control the force presentation section 156 to present a predetermined force to the user.

(Adjustment of Various Parameters)

As described above, the perceived mass M1 can be increased or reduced by changing various parameters recognized by the user (for example, the size of the tangible object, the brightness of the tangible object, and the like). Here, the correlation between the parameter for the tangible object and the perceived mass M1 can be expressed as a correlation function. Hence, by preliminarily determining a correlation function that indicates the correlation between the parameter for the tangible object and the perceived mass M1, the presentation control section 114 can adjust the parameter for the tangible object on the basis of the correlation function and the difference G. Here, as an example, a technique for adjusting the size of the tangible object will be described.

Figure 15:
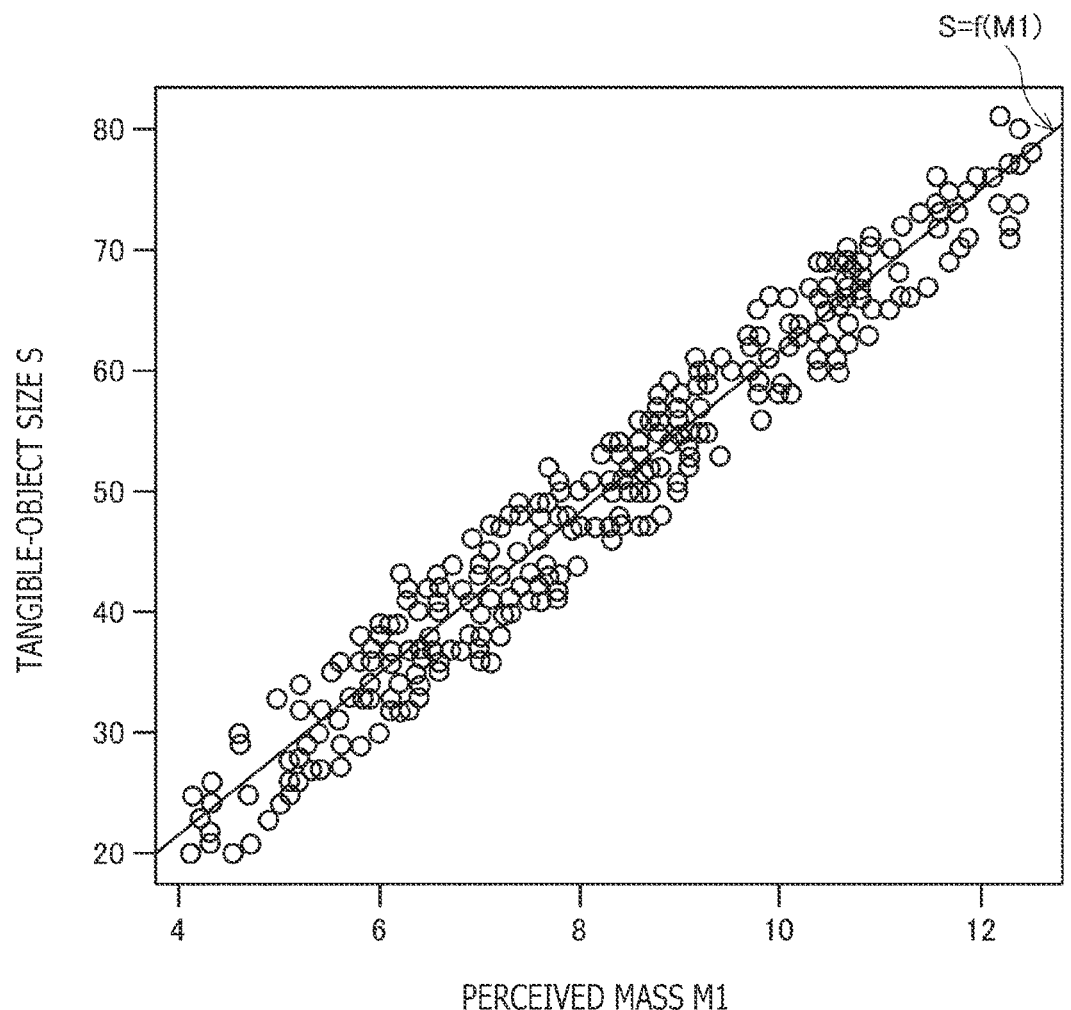
FIG. 15 is a diagram illustrating an example of a correlation function between the perceived mass and the size of the tangible object.

FIG. 15 is a diagram illustrating an example of a correlation function between the perceived mass M1 of the tangible object and an object size S. As depicted in FIG. 15, for each of multiple different tangible objects, the presentation control section 114 preliminarily accumulates, in the storage unit 140, the correspondence between the perceived mass M1 and the tangible-object size S, as accumulated data, and determines the correlation function S=f(M1) between the perceived mass M1 and the tangible-object size S on the basis of the accumulated data. Thus, the presentation control section 114 can calculate the amount of increase or decrease in the tangible-object size S by substituting the difference G into M1 of the correlation function S=f(M1) preliminarily determined.

The details of functions of the information processing apparatus 10 according to the embodiment of the present disclosure have been described above.

2. First Modification

Now, a first modification of the embodiment of the present disclosure will be described in detail. In the first modification of the embodiment of the present disclosure, the tangible object handled by the user is a virtual object.

Figure 16:
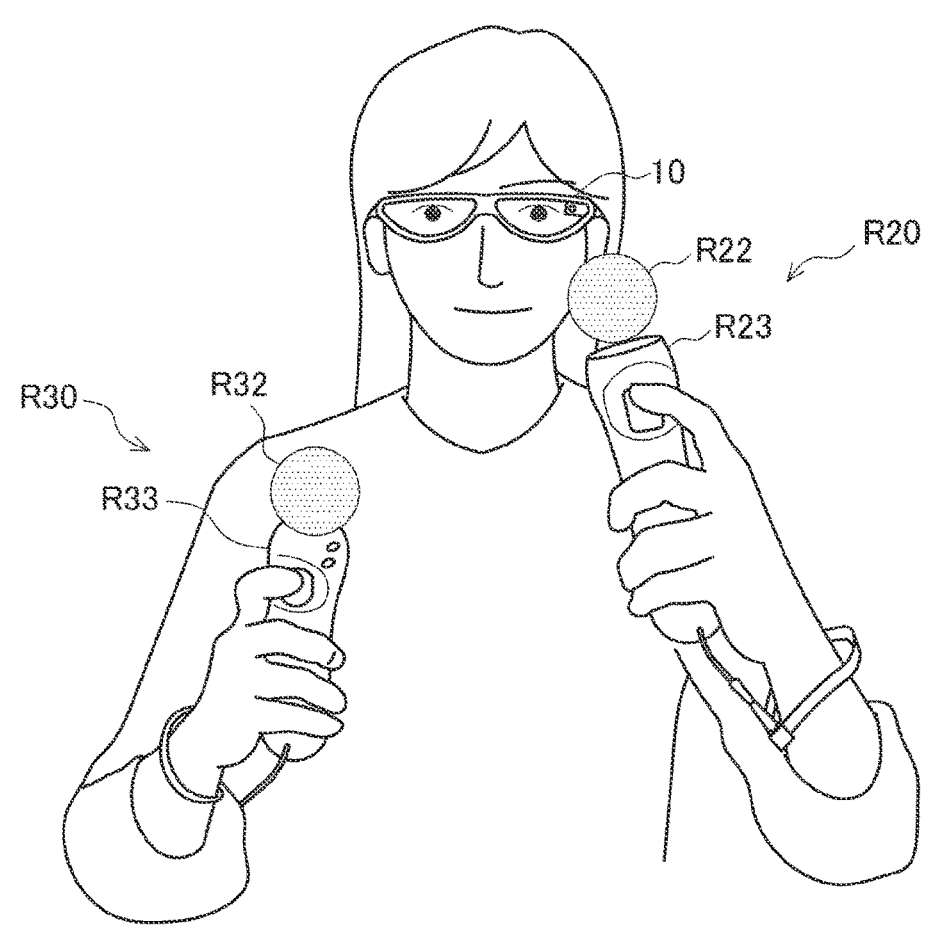
FIG. 16 is a diagram for describing a first modification.

FIG. 16 is a diagram for describing the first modification of the embodiment of the present disclosure. With reference to FIG. 16, the user wears the information processing apparatus 10 also in the first modification. Additionally, also in the first modification, the information processing apparatus 10 is mainly assumed to be an AR device worn on the body of the user. However, as described above, the information processing apparatus 10 is not limited to the AR device.

The information processing apparatus 10 is executing an application. Here, the application is assumed to be a game application. However, the application is not limited to a particular type. A virtual object as an example of the tangible object displayed by the display section 152 is controlled with progression of the application. While visually recognizing the virtual object as an example of the tangible object, the user operates a controller R20 and a controller R30 to control the progression of the application.

In an example illustrated in FIG. 16, two controllers are provided. However, one or three or more controllers may be provided. Additionally, in the example illustrated in FIG. 16, the controller R20 includes a tip portion R22 and a grip portion R23. However, the configuration of the controller R20 is not limited to a particular one. Similarly, in the example illustrated in FIG. 16, the controller R30 includes a tip portion R32 and a grip portion R33. However, the configuration of the controller R30 is not limited to a particular one.

The position of each of the controllers R20 and R30 is recognized by the information processing apparatus 10. For example, the position of each of the controllers R20 and R30 is recognized on the basis of a camera image. However, the position of each of the controllers R20 and R30 is recognized in any manner. The mass of each of the controllers R20 and R30 is preliminarily registered in the system. Additionally, the mass of a virtual object is preliminarily registered as the mass M2 that the system intends to present.

Here, virtual objects (for example, a sord, a gun, and the like) displayed by the display section 152 are controlled with progression of the application. For example, the virtual object may be displayed at a position corresponding to the position of the controller R20 or R30. However, in a case where the mass M1 of the virtual object that is perceived by the user does not match the mass of the controller R20 or R30 the position of which corresponds to the position of the virtual object being displayed, the user feels a sense of mismatch between the handling feelings (cognitive load).

As such, in the first modification, the estimation section 112 estimates the mass M1 of the virtual object that is perceived by the user, by using a technique similar to the technique for estimating the mass M1 of a real object that is perceived by the user. Then, the presentation control section 114 calculates the difference G between the mass M2 that the system intends to present (that is, the mass of the virtual object) and the mass M1 of the virtual object that is perceived by the user.

As described above, in a case where the difference G is above the threshold Th1, the presentation control section 114 may increase the perceived mass M1. Additionally, in a case where the difference G is below the threshold Th2, the presentation control section 114 may reduce the perceived mass M1. This eliminates the difference between the mass M2 that the system intends to present and the perceived mass M1, allowing a more effective reduction in the load imposed on the user, with the use of the force applied to the user in relation to the virtual object.

Alternatively, the presentation control section 114 may increase or reduce the perceived mass M1 such that the mass M1 of the virtual object that is perceived by the user is made closer to the mass of the controller R20 or R30 the position of which corresponding to the position of the virtual object being displayed. This can reduce the sense of mismatch between the handling feelings (cognitive load) given to the user. In this case, the technique for increasing or reducing the perceived mass M1 may be similar to the technique for increasing or reducing the perceived mass M1 to eliminate the difference between the mass M2 that the system intends to present and the perceived mass M1.

Note that the virtual object is also assumed to change dynamically with progression of the application. Hence, the presentation control section 114 may increase or reduce the perceived mass of the virtual object according to the dynamic change in the virtual object.

Figure 17:
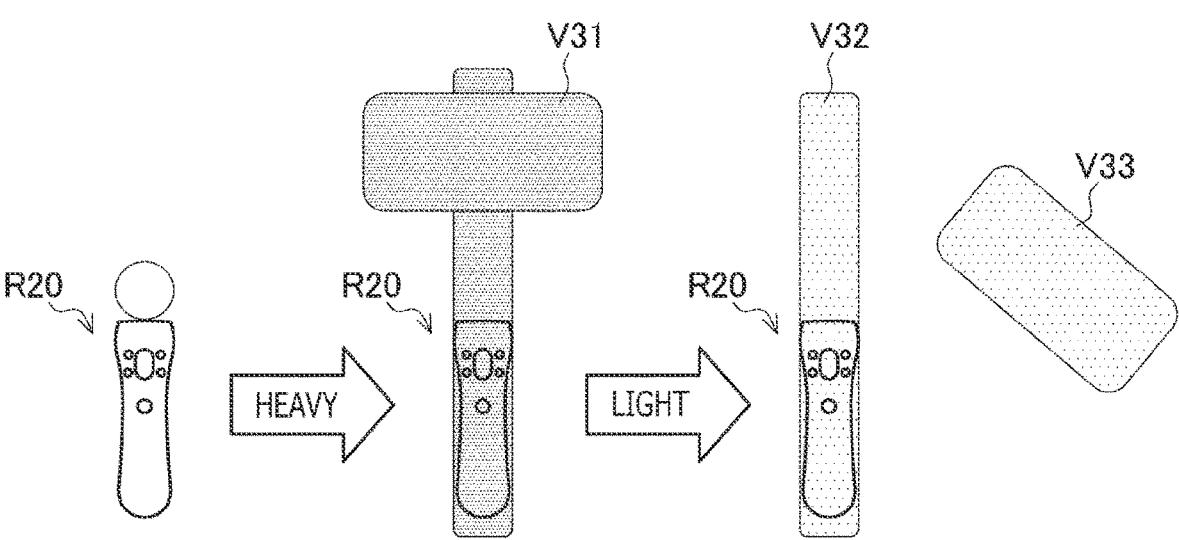
FIG. 17 is a diagram for describing a first example in which a virtual object changes dynamically with progression of an application.

FIG. 17 is a diagram for describing a first example in which a virtual object changes dynamically with progression of an application. FIG. 17 depicts the controller R20. Additionally, a virtual object V31 is displayed at a position corresponding to the position of the controller R20. In this case, the difference G between the mass M2 that the system intends to present (that is, the mass of the virtual object V31) and the mass M1 of the virtual object V31 that is perceived by the user is above the threshold Th1, and thus, the presentation control section 114 increases the perceived mass M1 (the virtual object V31 has a reduced brightness).

Now, assumed is a case where a part of the virtual object V31 (a hammer portion in FIG. 17) comes off with progression of the application. In such a case, a virtual object V33 having come off and the remaining virtual object V32 are each lighter than the original virtual object V31. Accordingly, the presentation control section 114 reduces the perceived mass of each of the virtual object V33 having come off and the remaining virtual object V32 (each of the virtual objects V33 and V32 has an increased brightness).

Figure 18:
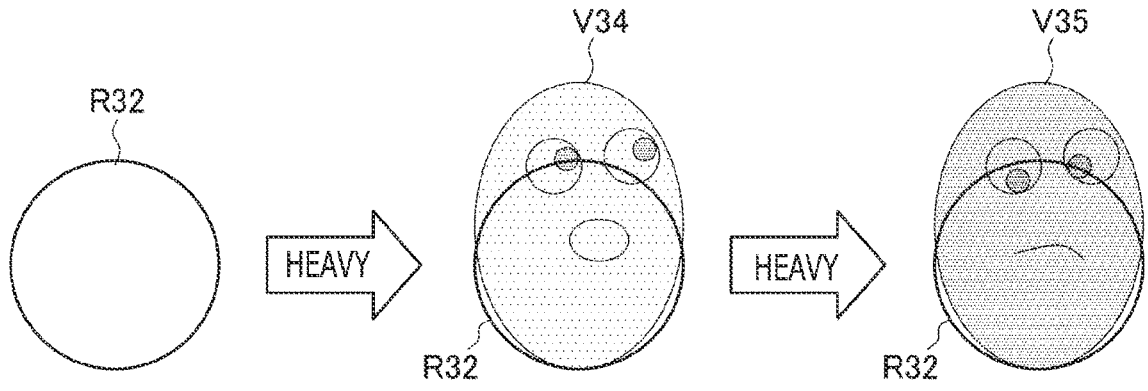
FIG. 18 is a diagram for describing a second example in which a virtual object changes dynamically with progression of an application.

FIG. 18 is a diagram for describing a second example in which a virtual object changes dynamically with progression of an application. FIG. 18 depicts the tip portion R32. Additionally, a virtual object V34 is displayed at a position corresponding to the position of the tip portion R32. In this case, the difference G between the mass M2 that the system intends to present (that is, the mass of the virtual object V31) and the mass M1 of the virtual object V34 that is perceived by the user is below the threshold Th2, and thus, the presentation control section 114 reduces the perceived mass M1 (the virtual object V34 has an increased brightness).

Now, the virtual object V34 is assumed to be stronger with progression of an application. For example, the virtual object V34 is an enemy character and becomes stronger with the increase in stamina (due to an increased difficulty in beating the enemy character). In such a case, the virtual object V34 is desirably made to appear to be heavier than the original virtual object V34. Accordingly, the presentation control section 114 increases the perceived mass of the virtual object V34 (the virtual object V34 has a reduced brightness).

The first modification of the embodiment of the present disclosure has been described in detail above.

3. Second Modification

Now, a second modification of the embodiment of the present disclosure will be described in detail. In the second modification of the embodiment of the present disclosure, the tangible object handled by the user is a virtual object as in the first modification.

Figure 19:
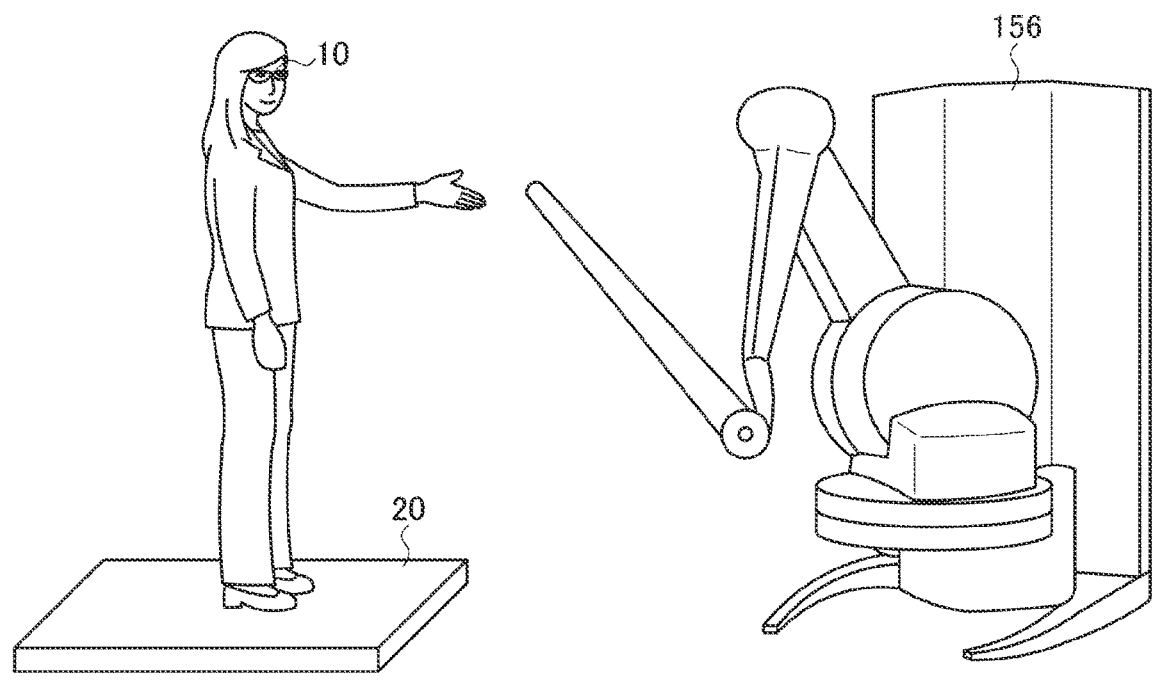
FIG. 19 is a diagram for describing a second modification.

FIG. 19 is a diagram for describing the second modification. With reference to FIG. 19, also in the second modification, the user wears the information processing apparatus 10. Additionally, also in the second modification, the information processing apparatus 10 is mainly assumed to be an AR device worn on the body of the user. However, as described above, the information processing apparatus 10 is not limited to the AR device.

The information processing apparatus 10 is executing an application. Here, the application is assumed to be a game application. However, the application is not limited to a particular type. A virtual object as an example of the tangible object displayed by the display section 152 is controlled with progression of the application. While visually recognizing the virtual object as an example of the tangible object, the user operates the force presentation section 156 to control the progression of the application.

Also, in the second modification, as is the case with the first modification, the mass of the virtual object is preliminarily registered as the mass M2 that the system intends to present. Additionally, in the second modification, the force presentation section 156 applies, to the user, the force corresponding to the mass of the virtual object (force feedback).

However, in a case where the mass M1 of the virtual object that is perceived by the user does not match the force that is applied by the force presentation section 156 to the user and that corresponds to the mass of the virtual object, the user feels the sense of mismatch between the handling feelings (cognitive load).

As such, in the second modification, the estimation section 112 estimates the mass M1 of the virtual object that is perceived by the user, by using a technique similar to the technique for estimating the mass M1 of a real object that is perceived by the user. Then, the presentation control section 114 calculates the difference G between the mass M2 that the system intends to present (that is, the mass of the virtual object) and the mass M1 of the virtual object that is perceived by the user.

As described above, in a case where the difference G is above the threshold Th1, the presentation control section 114 may increase the perceived mass M1. Additionally, as described above, in a case where the difference G is below the threshold Th2, the presentation control section 114 may reduce the perceived mass M1. This eliminates the difference between the mass M2 that the system intends to present and the perceived mass M1, allowing a more effective reduction in the load imposed on the user, with the use of the force applied to the user in relation to the virtual object.

Alternatively, in the second modification, the presentation control section 114 may adjust the mass M2 that the system intends to present, on the basis of the difference G, and control the force presentation section 156 to apply, to the user, the force corresponding to the adjusted "mass M2 that the system intends to present."

More specifically, in a case where the difference G is above the threshold Th1, the presentation control section 114 may reduce the mass M2 that the system intends to present. Additionally, in a case where the difference G is below the threshold Th2, the presentation control section 114 may increase the mass M2 that the system intends to present. This eliminates the difference between the mass M2 that the system intends to present and the perceived mass M1, allowing a more effective reduction in the load imposed on the user, with the use of the force applied to the user in relation to the virtual object.

However, also assumed is a case where the adjusted "mass M2 that the system intends to present" is above a predetermined upper limit (that is, the upper limit of the force that can be presented by the force presentation section 156). In such a case, the force presentation section 156 may fail to present the force corresponding to the adjusted "mass M2 that the system intends to present." As a result, the difference between the mass M2 that the system intends to present and the perceived mass M1 may not possibly be eliminated.

Hence, in a case where the adjusted "mass M2 that the system intends to present" is above the predetermined upper limit, the presentation control section 114 is only required to control the force presentation section 156 to apply, to the user, the force corresponding to the upper limit. In addition, the presentation control section 114 is only required to control the display section 152 to display an object corresponding to the amount by which the adjusted "mass M2 that the system intends to present" exceeds the upper limit.

As an example, the presentation control section 114 may reduce the size of the tangible object recognized by the user, in such a manner as to reduce the perceived mass M1 by the amount by which the adjusted "mass M2 that the system intends to present" exceeds the upper limit. Alternatively, the presentation control section 114 may increase the brightness of the tangible object recognized by the user, in such a manner as to reduce the perceived mass M1 by the amount by which the adjusted "mass M2 that the system intends to present" exceeds the upper limit. For the technique for reducing the size of the tangible object recognized by the user and the technique for increasing the brightness of the tangible object recognized by the user, the above-described techniques may be used.

The second modification of the embodiment of the present disclosure has been described in detail above.

4. Third Modification

Now, a third modification of the embodiment of the present disclosure will be described in detail.

Now, the third modification of the embodiment of the present disclosure will be described in detail. In the above description, mainly assumed is the case where the tangible object is handled (for example, the tangible object is lifted) by the hand of the user as a real object. However, in a case where the user can handle the virtual object, the virtual object handled by the user may remotely control the tangible object.

Figure 20:
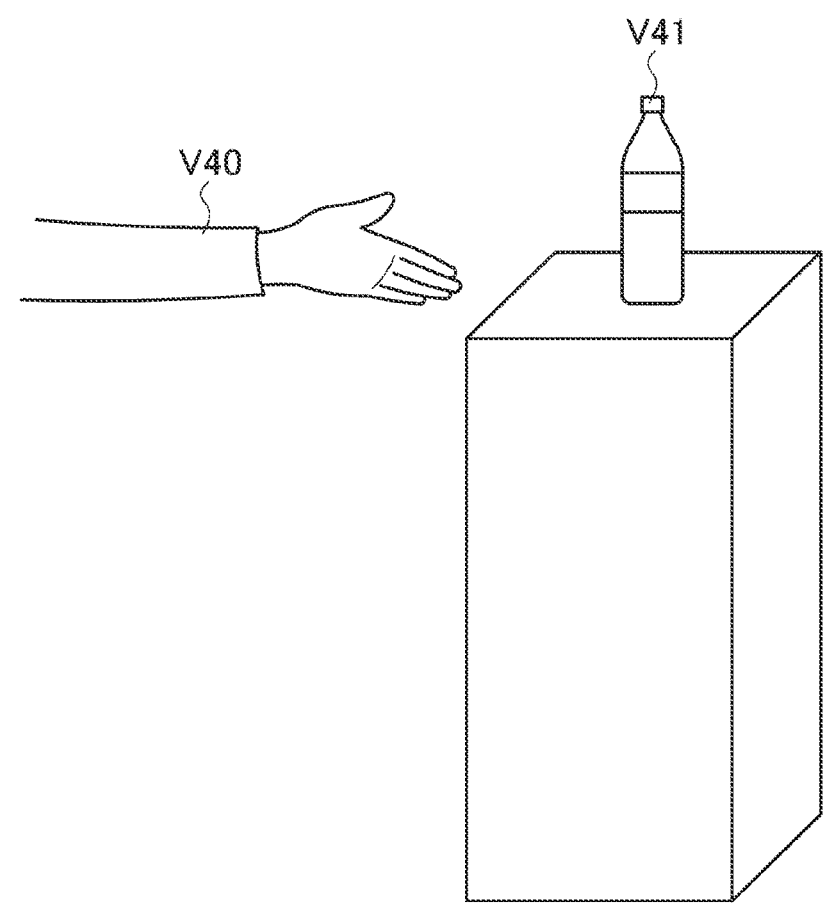
FIG. 20 is a diagram for describing a third modification.

FIG. 20 is a diagram for describing the third modification. FIG. 20 depicts a virtual object V40 that can be handled by the user. Here, the virtual object V40 has a shape of the hand. However, the shape of the virtual object V40 is not limited to a particular one. Additionally, a virtual object V41 is displayed.

By handling the virtual object V40, the user can cause the virtual object V40 to lift the virtual object V41. In this case, as described above, the presentation control section 114 can control information presented to the user, on the basis of the perceived mass M1 that is estimated by the estimation section 112 and the mass M2 that the system intends to present.

The third modification of the embodiment of the present disclosure has been described in detail above.

5. Hardware Configuration Example

Now, with reference to FIG. 21, a hardware configuration example of an information processing apparatus 900 as an example of the information processing apparatus 10 according to the embodiment of the present disclosure will be described. FIG. 21 is a block diagram depicting the hardware configuration example of the information processing apparatus 900. Note that the information processing apparatus 10 need not necessarily include the entire hardware configuration depicted in FIG. 21 and that a part of the hardware configuration depicted in FIG. 21 need not be included in the information processing apparatus 10.

As depicted in FIG. 21, the information processing apparatus 900 includes a CPU (Central Processing Unit) 901, a ROM (Read Only Memory) 903, and a RAM (Random Access Memory) 905. Additionally, the information processing apparatus 900 may include a host bus 907, a bridge 909, an external bus 911, an interface 913, an input device 915, an output device 917, a storage device 919, a drive 921, a connection port 923, and a communication device 925. Instead of or in addition to the CPU 901, the information processing apparatus 900 may include a processing circuit referred to as a DSP (Digital Signal Processor) or an ASIC (Application Specific Integrated Circuit).

The CPU 901 functions as an arithmetic processing device and a control device, and controls the general operation of the information processing apparatus 900 or a part of the operation thereof according to various programs recorded in the ROM 903, the RAM 905, the storage device 919, or a removable recording medium 927. The ROM 903 stores programs, arithmetic parameters, and the like used by the CPU 901. The RAM 905 temporarily stores programs used for execution by the CPU 901, parameters changing as appropriate during the execution, and the like. The CPU 901, the ROM 903, and the RAM 905 are connected together by a host bus 907 including an internal bus such as a CPU bus. Further, the host bus 907 is connected via a bridge 909 to an external bus 911 such as a PCI (Peripheral Component Interconnect/Interface) bus.

The input device is a device operated by the user, for example, buttons and the like. The input device 915 may include a mouse, a keyboard, a touch panel, switches, a lever, and the like. Additionally, the input device 915 may include a microphone that detects the voice of the user. The input device 915 may be a remote control device using infrared rays or any other radio waves or may be external connection equipment 929 such as a mobile phone which is compatible with the operation of the information processing apparatus 900. The input device 915 includes an input control circuit that generates an input signal on the basis of information input by the user and that outputs the input signal to the CPU 901. The user operates the input device 915 to input various types of data to the information processing apparatus 900 and give an instruction on processing operations to the information processing apparatus 900. Additionally, an imaging device 933 described later may also function as an input device by capturing images of a motion of the user's hand, images of the user's fingers, and the like. In this case, a pointing position may be determined according to the motion of the hand or the orientation of the fingers.

The output device 917 includes a device that can visually or auditorily notify the user of the acquired information. The output device 917 may be a display device such as an LCD (Liquid Crystal Display) or an organic EL (Electro-Luminescence) display, a sound output device such as a speaker and a headphone, or the like. Additionally, the output device 917 may include a PDP (Plasma Display Panel), a projector, a hologram, a printer device, and the like. The output device 917 outputs a result of processing performed by the information processing apparatus 900, as text or a video such as an image or as a sound such as a voice or acoustics. Additionally, the output device 917 may include a light or the like to brighten up surroundings.

The storage device 919 is a device for data storage which is configured as an example of the storage unit of the information processing apparatus 900. The storage device 919 includes, for example, a magnetic storage device such as an HDD (Hard Disk Drive), a semiconductor storage device, an optical storage device, or a magneto-optic storage device. The storage device 919 stores programs to be executed by the CPU 901, various types of data, various types of data that are externally acquired, and the like.

The drive 921 is a reader/writer for the removable recording medium 927, such as a magnetic disk, an optical disc, a magneto-optic disc, or a semiconductor memory, and is built into or externally attached to the information processing apparatus 900. The drive 921 reads information recorded in the attached removable recording medium 927 and outputs the information to the RAM 905. Additionally, the drive 921 writes records into the attached removable recording medium 927.

The connection port 923 is a port for connecting equipment directly to the information processing apparatus 900. The connection port 923 may be, for example, a USB (Universal Serial Bus) port, an IEEE 1394 port, a SCSI (Small Computer System Interface) port, or the like. Alternatively, the connection port 923 may be an RS-232C port, an optical audio terminal, an HDMI (registered trademark) (High-Definition Multimedia Interface) port, or the like. With the external connection equipment 929 connected to the connection port 923, various types of data may be exchanged between the information processing apparatus 900 and the external connection equipment 929.

The communication device 925 is, for example, a communication interface including a communication device for connection to a network 931. The communication device 925 may be, for example, a communication card for a wired or wireless LAN (Local Area Network), Bluetooth (registered trademark), or WUSB (Wireless USB). Additionally, the communication device 925 may be a router for optical communication, a router for ADSL (Asymmetric Digital Subscriber Line), a modem for any of various communications, or the like. The communication device 925, for example, transmits and receives signals and the like to and from the Internet and other communication equipment by using a predetermined protocol such as TCP/IP. Additionally, the network 931 connected to the communication device 925 is a network connected in a wired or wireless manner, for example, the Internet, a home LAN, infrared communication, radio wave communication, satellite communication, or the like.

6. Summary

According to the embodiment of the present disclosure, there is provided the information processing apparatus 10 that includes the estimation section 112 configured to estimate, on the basis of the state of the user, the first amount that is predicted by the user with regard to the force applied to the user in relation to the tangible object, and the presentation control section 114 configured to control the information presented to the user, on the basis of the first amount and the second amount that is preliminarily registered with regard to the force.

According to such a configuration, there is provided a technology that enables an effective reduction in the load imposed on the user, with the use of the force applied to the user in relation to the tangible object.

The preferred embodiment has been described above in detail with reference to the accompanied drawings. However, the technical scope of the present disclosure is not limited to such examples. It is clear that those who have ordinary knowledge in the technical field of the present disclosure could easily have devised various changes or modifications within the spirit and scope of the appended claims, and these changes and modifications are understood as reasonably belonging to the technical scope of the present disclosure.

Additionally, the effects described herein are only informative or illustrative and not restrictive. In other words, in addition to or instead of the above-described effects, the technology according to the present disclosure can produce other effects that are obvious to those skilled in the art from the description herein.

Note that the technical scope of the present disclosure also covers the following configurations.

(1)

An information processing apparatus including:

a control unit configured to estimate, on the basis of a state of a user, a first amount that is predicted by the user with regard to force applied to the user in relation to a tangible object, and control presentation of information to the user on the basis of the first amount and a second amount that is preliminarily registered with regard to the force.

(2)

The information processing apparatus according to (1) above, in which the control unit controls the presentation of the information to the user on the basis of a difference that is calculated according to the second amount and the first amount.

(3)

The information processing apparatus according to (2) above, in which the control unit performs control to present predetermined information to the user, on the basis of the difference exceeding a predetermined threshold.

(4)

The information processing apparatus according to (3) above, in which the control unit performs control to display an object for increasing or reducing a size of the tangible object recognized by the user, on the basis of the difference exceeding the threshold.

(5)

The information processing apparatus according to (3) above, in which the control unit performs control to display an object with brightness different from brightness of the tangible object, in at least a partial area of the tangible object in a field of view of the user, on the basis of the difference exceeding the threshold.

(6)

The information processing apparatus according to (3) above, in which the control unit performs control to display a video depicting a motion associated with the tangible object, on the basis of the difference exceeding the threshold.

(7)

The information processing apparatus according to (6) above, in which the motion associated with the tangible object is a motion in which a subject different from the user is holding the tangible object in such a manner that the tangible object appears to be light or a motion in which the subject is holding the tangible object in such a manner that the tangible object appears to be heavy.

(8)

The information processing apparatus according to (3) above, in which the control unit performs control to display a predetermined object at a predetermined position corresponding to an area of the tangible object in a field of view of the user, on the basis of the difference exceeding the threshold.

(9)

The information processing apparatus according to (3) above, in which the control unit performs control to present at least either predetermined text or a predetermined sound, on the basis of the difference exceeding the threshold.

(10)

The information processing apparatus according to (2) above, in which the control unit performs control to display an object whose motion corresponds to the difference.

(11)

The information processing apparatus according to (10) above, in which the motion includes at least either a motion of traveling at a velocity corresponding to the difference or a motion of rebounding to a degree of rebound corresponding to the difference.

(12)

The information processing apparatus according to (2) above, in which the control unit adjusts the second amount on the basis of the difference and performs control to provide the user with force corresponding to the adjusted second amount.

(13)

The information processing apparatus according to (12) above, in which, in a case where the adjusted second amount is above a predetermined upper limit, the control unit performs control to provide the user with force corresponding to the upper limit and performs control to display an object corresponding to an amount by which the adjusted second amount exceeds the upper limit.

(14)

The information processing apparatus according to any one of (2) to (13) above, in which the control unit calculates the difference on the basis of subtraction of the first amount from the second amount.

(15)

The information processing apparatus according to (14) above, in which the control unit calculates the difference on the basis of subtraction of the first amount from the second amount to which an amount corresponding to a difficulty level of handling of the tangible object or an amount corresponding to an importance level of the tangible object has been added.

(16)

The information processing apparatus according to any one of (1) to (15) above, in which the first amount is an amount that is predicted by the user with regard to a magnitude of the force or a mass of the tangible object, and the second amount is a preliminarily registered magnitude of the force or a preliminarily registered mass of the tangible object.

(17)

The information processing apparatus according to any one of (1) to (16) above, in which a state of the user includes posture information regarding the user.

(18)

The information processing apparatus according to any one of (1) to (17) above, in which the tangible object is a real object or a virtual object.

(19)

An information processing method including:

estimating, by a processor, on the basis of a state of a user, a first amount that is predicted by the user with regard to force applied to the user in relation to a tangible object; and controlling, by the processor, presentation of information to the user on the basis of the first amount and a second amount that is preliminarily registered with regard to the force.

(20)

A program causing a computer to function as:

an information processing apparatus including a control unit configured to estimate, on the basis of a state of a user, a first amount that is predicted by the user with regard to force applied to the user in relation to a tangible object, and control presentation of information to the user on the basis of the first amount and a second amount that is preliminarily registered with regard to the force.

REFERENCE SIGNS LIST

1: Information processing system
10: Information processing apparatus
110 Control unit
112: Estimation section
114: Presentation control section
120: Control unit
130: Operation unit
140: Storage unit
150: Presentation unit
152: Display section
154: Sound output section
156: Force presentation section
20: Sensor unit

The invention claimed is:

1. An information processing apparatus comprising:
circuitry configured to
acquire state information of a user during a preparatory motion of the user as the user prepares to handle a tangible object,
estimate, based on the acquired state information, a first amount corresponding to a force predicted by the user regarding the tangible object, and
control presentation of information to the user based on the first amount and a second amount stored in a memory in association with a force to be provided to the user when the user handles the tangible object.

2. The information processing apparatus according to claim 1,
wherein the circuitry controls the presentation of the information to the user based on a difference that is calculated between the second amount and the first amount.

3. The information processing apparatus according to claim 2,
wherein the circuitry performs control to present predetermined information to the user, based on the difference exceeding a predetermined threshold.

4. The information processing apparatus according to claim 3,
wherein the circuitry performs control to display a virtual object for increasing or reducing a size of the tangible object recognized by the user, based on the difference exceeding the threshold.

5. The information processing apparatus according to claim 3,
wherein the circuitry performs control to display a virtual object with brightness different from brightness of the tangible object, in at least a partial area of the tangible object in a field of view of the user, based on the difference exceeding the threshold.

6. The information processing apparatus according to claim 3,
wherein the circuitry performs control to display a video depicting a motion of a subject handling the tangible object, based on the difference exceeding the threshold.

7. The information processing apparatus according to claim 6, wherein the motion of the subject is a motion in which the subject is holding the tangible object to represent a light weight or a motion in which the subject is holding the tangible object to represent a heavy weight.

8. The information processing apparatus according to claim 3, wherein the circuitry performs control to display a virtual object at a predetermined position corresponding to an area of the tangible object in a field of view of the user, based on the difference exceeding the threshold.

9. The information processing apparatus according to claim 3, wherein the circuitry performs control to present at least either predetermined text or a predetermined sound, based on the difference exceeding the threshold.

10. The information processing apparatus according to claim 2, wherein the circuitry performs control to display a virtual object whose motion corresponds to the difference.

11. The information processing apparatus according to claim 10, wherein the motion includes at least one a motion of traveling at a velocity corresponding to the difference or a motion of rebounding to a degree of rebound corresponding to the difference.

12. The information processing apparatus according to claim 2, wherein the circuitry is further configured to adjust the second amount based on the difference, and perform control to provide the user with a force corresponding to the adjusted second amount.

13. The information processing apparatus according to claim 12, wherein, in a case where the adjusted second amount is above a predetermined upper limit, the circuitry performs control to provide the user with force corresponding to the upper limit and performs control to display a virtual object corresponding to an amount by which the adjusted second amount exceeds the upper limit.

14. The information processing apparatus according to claim 2, wherein the circuitry is further configured to calculate the difference based on subtraction of the first amount from the second amount.

15. The information processing apparatus according to claim 14, wherein the circuitry calculates the difference based on subtraction of the first amount from the second amount to which an amount corresponding to a difficulty level of handling of the tangible object or an amount corresponding to an importance level of the tangible object has been added.

16. The information processing apparatus according to claim 1, wherein the first amount is an amount that is predicted by the user with regard to a magnitude of the force or a mass of the tangible object, and wherein the second amount is magnitude of the force or a mass of the tangible object stored in the memory.

17. The information processing apparatus according to claim 1, wherein the state information includes posture information regarding the user.

18. The information processing apparatus according to claim 1, wherein the tangible object is a real object or a virtual object.

19. An information processing method, executed by at least one processor, the method comprising:

acquiring state information of a user during a preparatory motion of the user as the user prepares to handle a tangible object;

estimating, based on the acquired state information, a first amount corresponding to a force predicted by the user regarding the tangible object; and controlling presentation of information to the user based on the first amount and a second amount stored in a memory in association with a force to be provided to the user when the user handles the tangible object.

20. A non-transitory computer-readable storage medium having embodied thereon a program, which when executed by a computer causes the computer to function as execute a method, the method comprising:

acquiring state information of a user during a preparatory motion of the user as the user prepares to handle a tangible object;

estimating, based on the acquired state information, a first amount corresponding to a force predicted by the user regarding the tangible object; and controlling presentation of information to the user based on the first amount and a second amount stored in a memory in association with a force to be provided to the user when the user handles the tangible object.

* * * * *